US006628264B1

(12) United States Patent
Kobayashi et al.

(10) Patent No.: US 6,628,264 B1
(45) Date of Patent: Sep. 30, 2003

(54) ENTERTAINMENT SYSTEM, ENTERTAINMENT APPARATUS, RECORDING MEDIUM, AND PROGRAM

(75) Inventors: Takaki Kobayashi, Hokkaido (JP); Eiji Uriya, Hokkaido (JP); Akira Koike, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 315 days.

(21) Appl. No.: 09/644,675

(22) Filed: Aug. 24, 2000

(30) Foreign Application Priority Data

Aug. 27, 1999 (JP) .......................... 11-242158

(51) Int. Cl.⁷ ............................... G09G 5/00
(52) U.S. Cl. ....................... 345/156; 463/37
(58) Field of Search ................ 345/156, 161, 345/163, 168; 273/148 B, 440, 453, 461; 463/7, 8, 23, 30–39, 47; 700/245, 246, 253, 257, 258, 159, 180, 187

(56) References Cited

U.S. PATENT DOCUMENTS

| 4,995,610 | A | | 2/1991 | Paoletti ................. 273/85 |
| 5,692,956 | A | * | 12/1997 | Rifkin ................. 345/163 |
| 6,135,450 | A | * | 10/2000 | Huang et al. ........... 273/148 B |
| 6,183,259 | B1 | * | 2/2001 | Macri et al. ............ 345/156 |

FOREIGN PATENT DOCUMENTS

| EP | 0 744 199 A2 | | 11/1996 | |
| EP | 0 915 412 A2 | | 5/1999 | |
| EP | 1 000 643 A2 | | 5/2000 | |
| JP | 06-198075 | * | 7/1994 | ............. A63F/9/22 |
| JP | 9-308769 | | 12/1997 | |
| JP | 10-295937 | | 11/1998 | |
| JP | 11-019336 | * | 1/1999 | ............. A63F/9/22 |
| JP | 11-244530 | | 9/1999 | |

OTHER PUBLICATIONS

"Detailed Description" (machine translation of Japanese Application JP–11–244530, member of Patent family includes Korean PAtent Apllication KR 99037465 published May 25, 1999).*

* cited by examiner

Primary Examiner—Richard Hjerpe
Assistant Examiner—Alexander Eisen
(74) Attorney, Agent, or Firm—Paul A. Guss

(57) ABSTRACT

Two manual controllers are connected to two slots of an entertainment apparatus via connectors, respectively. One of the manual controllers is manipulated as a manual input device by a user. The other manual controller is placed upside down on a table, for example, and moves by vibrations so as to functions as a movable object (movable device). The user can move the movable device synchronously with the movement of an object displayed on a display monitor by manipulating the manual controller.

19 Claims, 23 Drawing Sheets

FIG. 21

MOVEMENT PATTERN FILE

| | | |
|---|---|---|
| RECORD 0 | LEFT VIBRATION VALUE $V_L$ | RIGHT VIBRATION VALUE $V_R$ |
| RECORD 1 | LEFT VIBRATION VALUE $V_L$ | RIGHT VIBRATION VALUE $V_R$ |
| RECORD 2 | LEFT VIBRATION VALUE $V_L$ | RIGHT VIBRATION VALUE $V_R$ |
| RECORD 3 | LEFT VIBRATION VALUE $V_L$ | RIGHT VIBRATION VALUE $V_R$ |

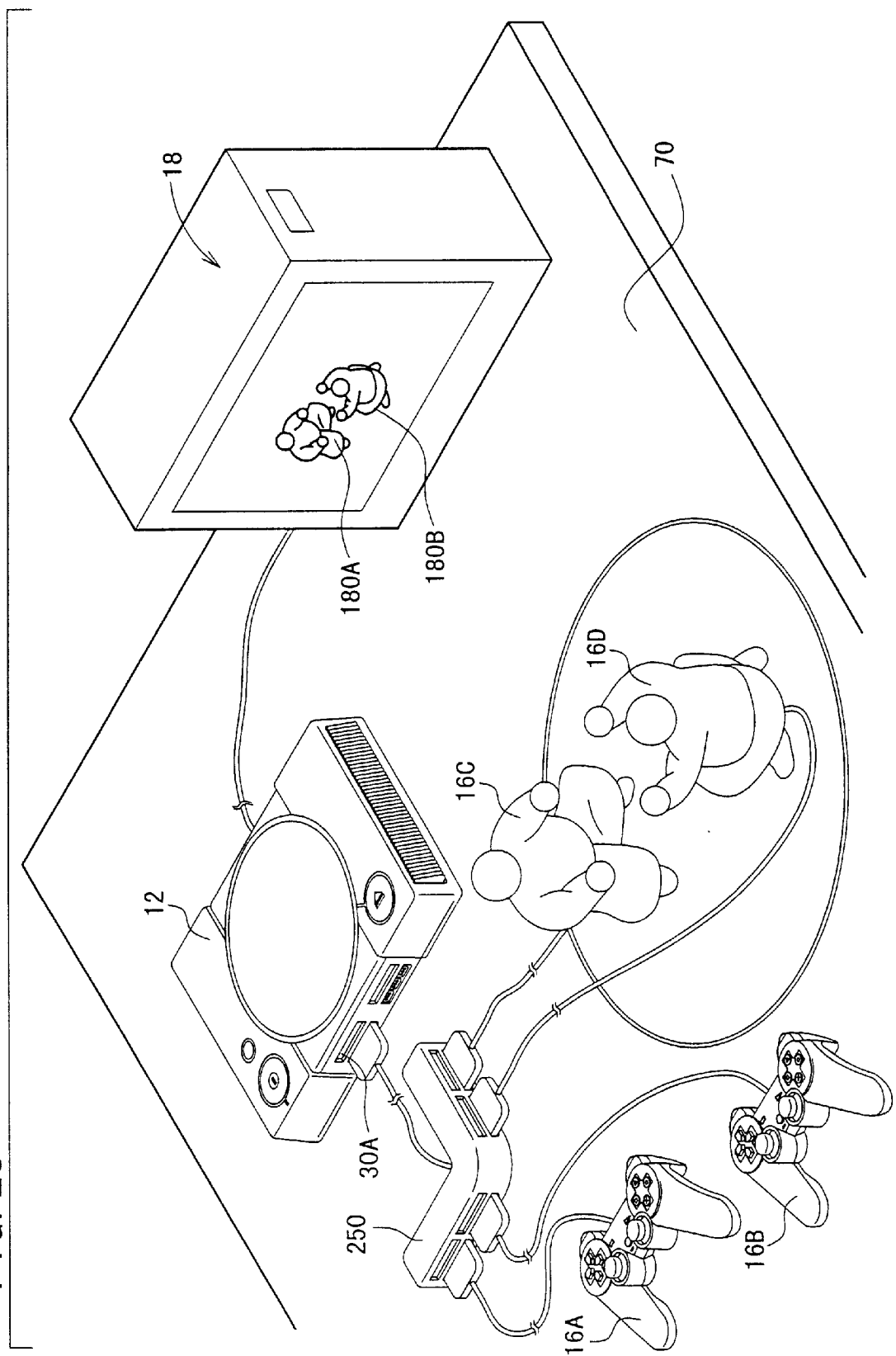

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system comprising an entertainment apparatus for executing various programs, and at least one manual controller for inputting a manual control request of a user to the entertainment apparatus. Further, the present invention relates to the entertainment apparatus for constituting the entertainment system, a recording medium for use of the entertainment system, and a program itself.

2. Description of the Related Art

Some entertainment systems having entertainment apparatus which include video game machines execute a game according to a game program which is read from a recording medium such as a CD-ROM or the like under the control of a manual controller while game images are being displayed on a display screen of a television receiver based on data read from the recording medium.

The entertainment apparatus and the manual controller are usually connected to each other by serial interfaces. When a clock signal is sent from the entertainment apparatus to the manual controller, the manual controller sends key switch information corresponding to manual input actions of a user in synchronism with the clock signal.

Recently, there has been developed and used a system having a manual controller which incorporates therein a vibration generating mechanism for imparting vibrations to a user in response to a request from an external drive, for example, the entertainment apparatus. While a game is in progress on the entertainment apparatus, various vibrations corresponding to manual input actions of the user are generated and imparted to the user.

In such circumstances, various games utilizing the above-described entertainment apparatus are currently available on the market. However, typically, these games are merely directed to allow a user to move (control) virtual objects (images) imitating people, cars, airplanes, cards or the like on a monitor screen by manipulating a manual controller. That is, in most cases, the user can play these games only on the display monitor.

SUMMARY OF THE INVENTION

It is therefore an object of the present invention to provide an entertainment system, an entertainment apparatus, a recording medium, and a program for allowing an actual object (three-dimensional object) imitating a virtual object (two-dimensional object) displayed on a monitor screen to move synchronously with the movement of the virtual object displayed on the monitor screen.

According to the present invention, an entertainment system comprises:

an entertainment apparatus for executing various programs;

at least one manual controller for inputting a manual control request of a user to the entertainment apparatus; and at least one movable device, the movable device being movable in accordance with an instruction from the entertainment apparatus.

Further, according to the present invention, an entertainment apparatus is connectable to:

at least one manual controller for inputting a manual control request of a user to the entertainment apparatus;

a display monitor; and at least one movable device, the movable device being movable in accordance with an instruction from the entertainment apparatus.

Accordingly, the three-dimensional actual movable device moves in accordance with the instruction from the entertainment apparatus. For example, the user can move an object displayed on a monitor screen and move the movable device synchronously with the movement of the object displayed on the monitor screen.

Therefore, when the entertainment system according to the present invention or the entertainment apparatus according to the present invention is applied to a video game apparatus, the user can enjoy not only viewing (controlling) the two-dimensional movement of the virtual object displayed on the monitor screen but also viewing (controlling) the three-dimensional movement of the actual movable device. Accordingly, a new amusing aspect can be added to the video game.

In the arrangement, the entertainment system may comprise a plurality of the manual controllers and at least one of the manual controllers may comprise the movable device.

Further, in the arrangement, the entertainment system may comprise a display monitor for displaying an image outputted from the entertainment apparatus and movement instructing means for moving the movable device synchronously with the movement of an object displayed on the display monitor.

In the arrangement, the object may move in accordance with movement information based on an input signal from the manual controller. Alternatively, the object may move in accordance with predetermined movement information.

Further, in the arrangement, the movable device may comprise vibration generating means for generating vibrations in accordance with the instruction comprising vibration information from the entertainment apparatus. Further, the movement instructing means may comprise:

object displaying means for displaying the object on the display monitor and moving the object on the display monitor in accordance with the movement information; and vibration instructing means for outputting the movement information to the vibration generating means as the vibration information.

In the arrangement, the vibration generating means may comprise a plurality of vibration sources having different vibration characteristics and the vibration instructing means may calculate the vibration information to be supplied to each of the vibration sources based on the vibration characteristics of the vibration sources.

Next, according to the present invention, a recording medium stores a program and data for use of an entertainment system, the entertainment system comprising:

an entertainment apparatus for executing various programs;

at least one manual controller for inputting a manual control request of a user to the entertainment apparatus, the manual controller being connectable to the entertainment apparatus;

at least one movable device, the movable device being connectable to the entertainment apparatus and movable in accordance with an instruction from the entertainment apparatus; and a display monitor for displaying at least one object, wherein the program comprises the step of generating a movement instruction for moving the movable device synchronously with the movement of the object displayed on the display monitor.

Further, according to the present invention, a program is readable and executable by a computer, the program being for use of an entertainment system comprising:

an entertainment apparatus for executing various programs;

at least one manual controller for inputting a manual control request of a user to the entertainment apparatus, the manual controller being connectable to the entertainment apparatus;

at least one movable device, the movable device being connectable to the entertainment apparatus and movable in accordance with an instruction from the entertainment apparatus; and a display monitor for displaying at least one object, wherein said step of generating a movement instruction comprises the step of moving the movable device synchronously with the movement of the object displayed on the display monitor.

With the use of the recording medium, the three-dimensional actual movable device can move in accordance with the instruction from the entertainment apparatus. For example, the user can move an object displayed on a monitor screen and move the movable device synchronously with the movement of the object displayed on the monitor screen.

Accordingly, when the recording medium for storing a program and data according to the present invention or the program according to the present invention is applied to a video game apparatus, the user can enjoy not only viewing (controlling) the two-dimensional movement of the virtual object displayed on the monitor screen but also viewing (controlling) the three-dimensional movement of the actual movable device. Accordingly, a new amusing aspect can be added to the video game.

In the arrangement, the object may move in accordance with movement information based on an input signal form the manual controller. Alternatively, the object may move in accordance with predetermined movement information.

Further, in the arrangement, the movable device may comprise vibration generating means for generating vibrations in accordance with the instruction comprising vibration information from the entertainment apparatus. Further, said step of generating a movement instruction may comprise the steps of:

displaying the object on the display monitor and moving the object on display monitor in accordance with the movement information; and generating a vibration instruction for outputting the movement information to the vibration generating means as the vibration information.

In the arrangement, the vibration generating means may comprise a plurality of vibration sources having different vibration characteristics and the vibration information to be supplied to each of said vibration sources may be calculated based on the vibration characteristics of the vibration sources in the step of generating a vibration instruction.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 21 is a view showing contents of a movement pattern file;

FIG. 23 is a view showing a condition in which the entertainment system according another embodiment of the present invention is used.

DESCRIPTION OF THE PREFERRED EMBODIMENTS

Embodiments of the entertainment system and recording medium according to the present invention will be described with reference to FIGS. 1 through 23.

Figure 1:
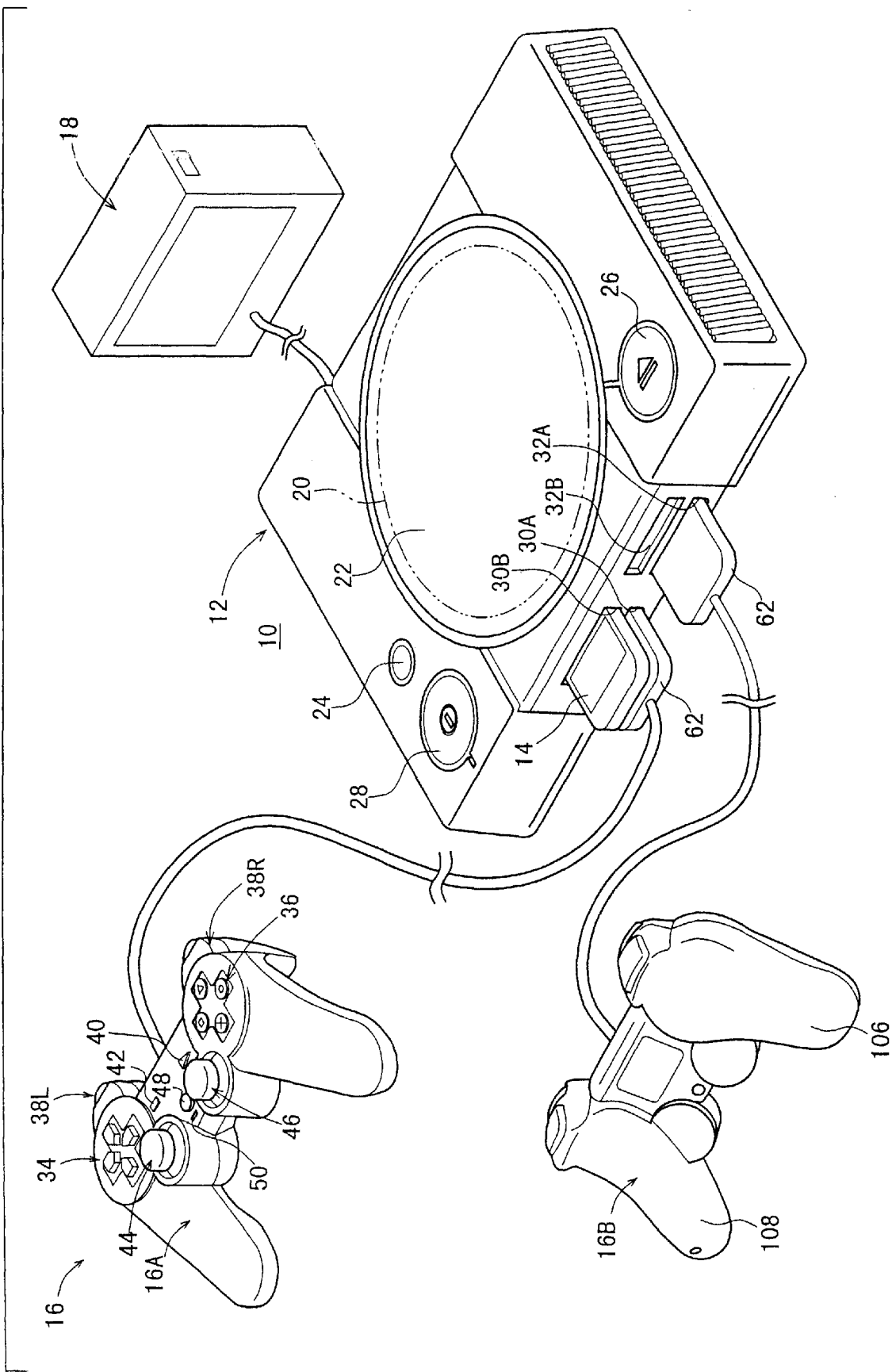
FIG. 1 is a perspective view of an entertainment system according to an embodiment of the present invention.

As shown in FIG. 1, an entertainment system 10 basically comprises an entertainment apparatus 12 for executing various programs, a memory card 14 detachably connected to the entertainment apparatus 12, manual controllers 16 (16A, 16B) detachably connected to the entertainment apparatus 12 by connectors 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 (16A, 16B) may be connected respectively to the lower slots units 30A, 32A, and memory cards 14 (or unillustrated portable information terminals having the function of the memory card 14) for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
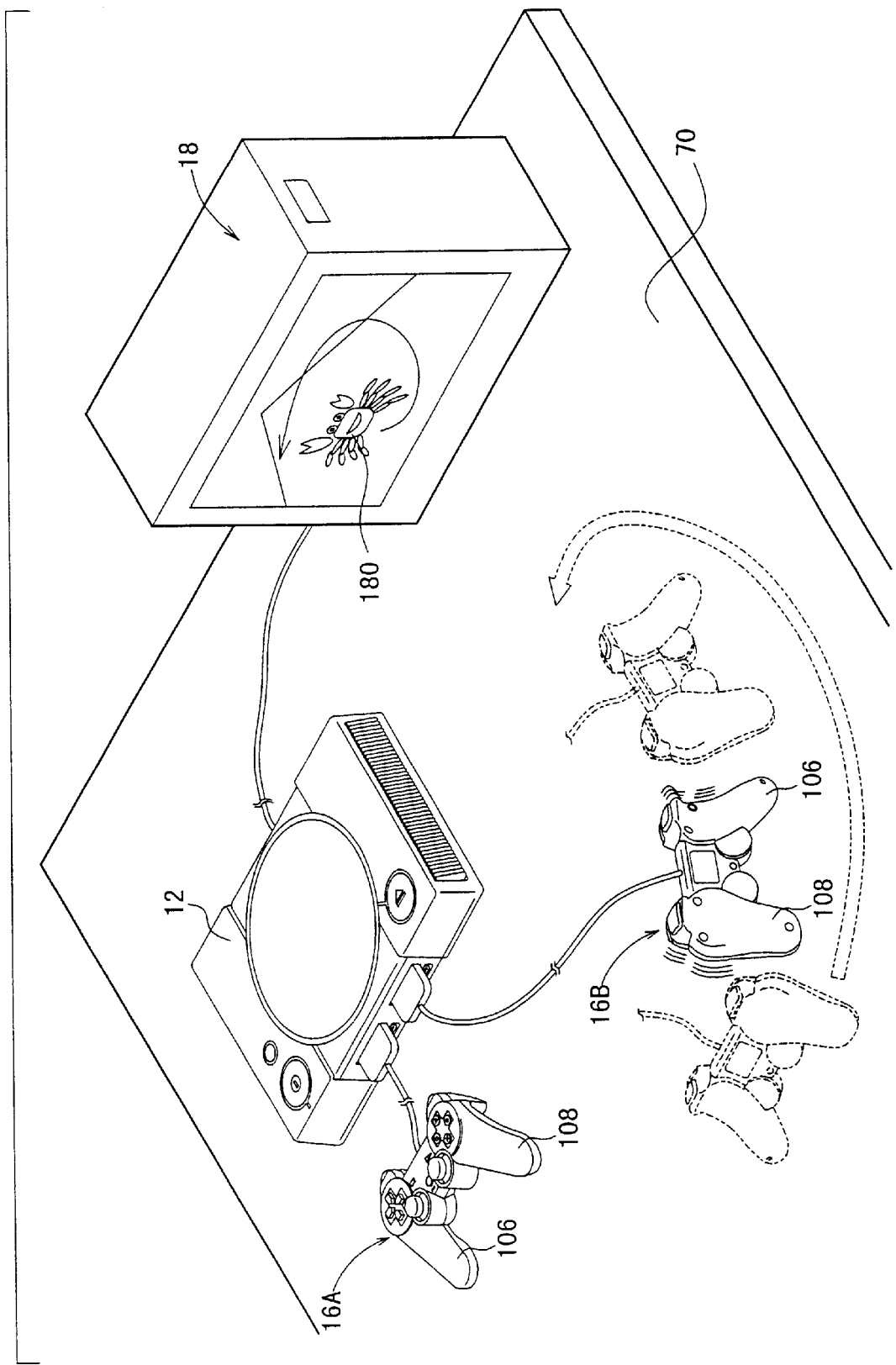
FIG. 2 is a view showing a condition in which the entertainment system according the embodiment of the present invention is used.

In particular, according to an embodiment of the present invention, the two manual controllers 16A, 16B are connected to the two slots 30A, 32A of the entertainment system 10 via connectors 62, respectively. For example, the manual controller 16A connected to the left slot 30A is manipulated as a manual input device by a user, while the manual controller 16B connected to the right slot 32A functions as a movable object (movable device 16B). As shown in FIG. 2, the manual controller (movable device) 16B is placed upside down and moves on a table 70 in accordance with an instruction from the manual controller 16A by means of vibrations.

As shown in FIG. 1, the manual controller 16 has first and second control pads 34, 36, an L (Left) button 38L, an R (Right) button 38R, a start button 40, and a selection button 42. The manual controller 16 also has joysticks 44, 46 for making analog control actions, a mode selection switch 48 for selecting control modes of the joysticks 44, 46, and an indicator 50 for indicating a selected control mode. The indicator 50 comprises a light-emitting element such as a light-emitting diode or the like.

Figure 3:
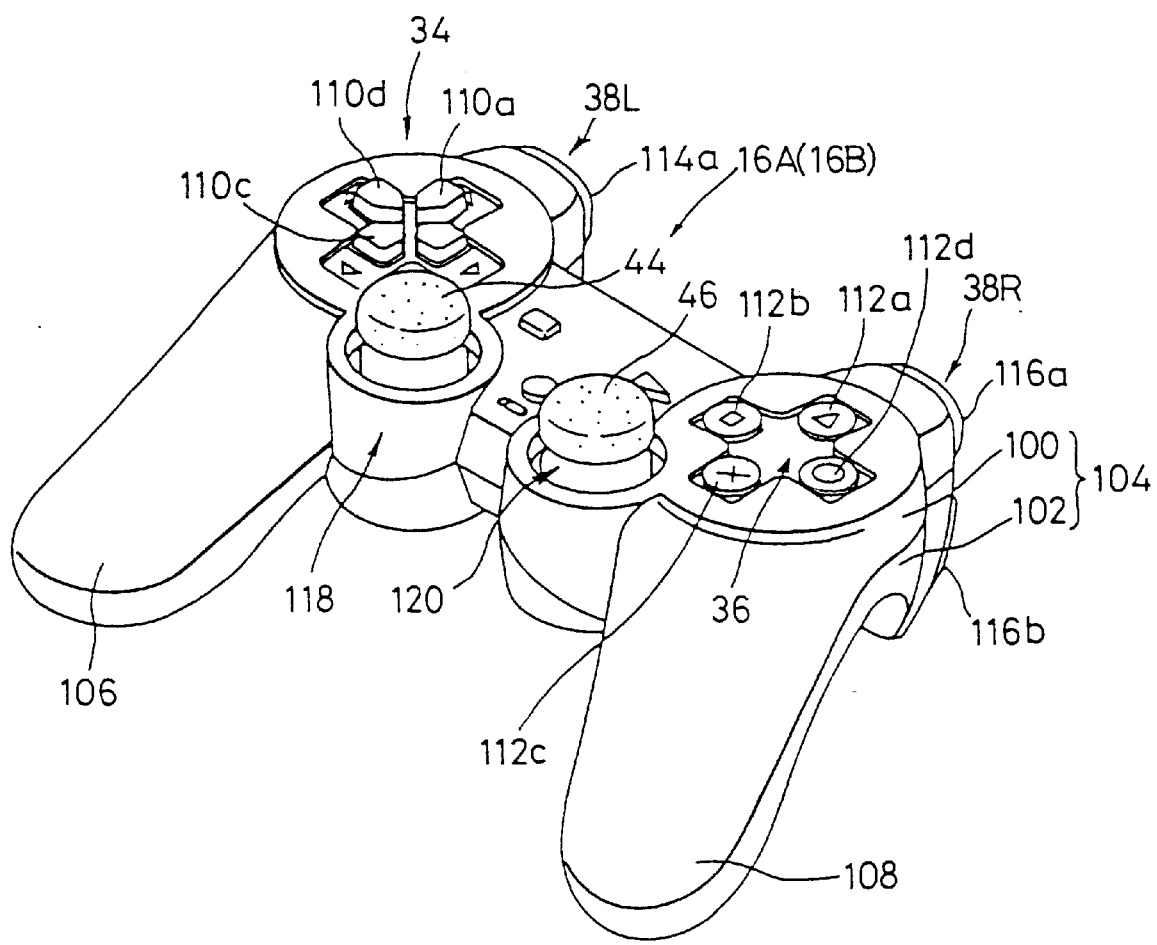
FIG. 3 is a perspective view of a manual controller.

As shown in FIG. 3, the manual controller 16 has a housing 104 comprising an upper member 100 and a lower member 102 which are mated and joined to each other by fasteners such as screws.

Figure 4:
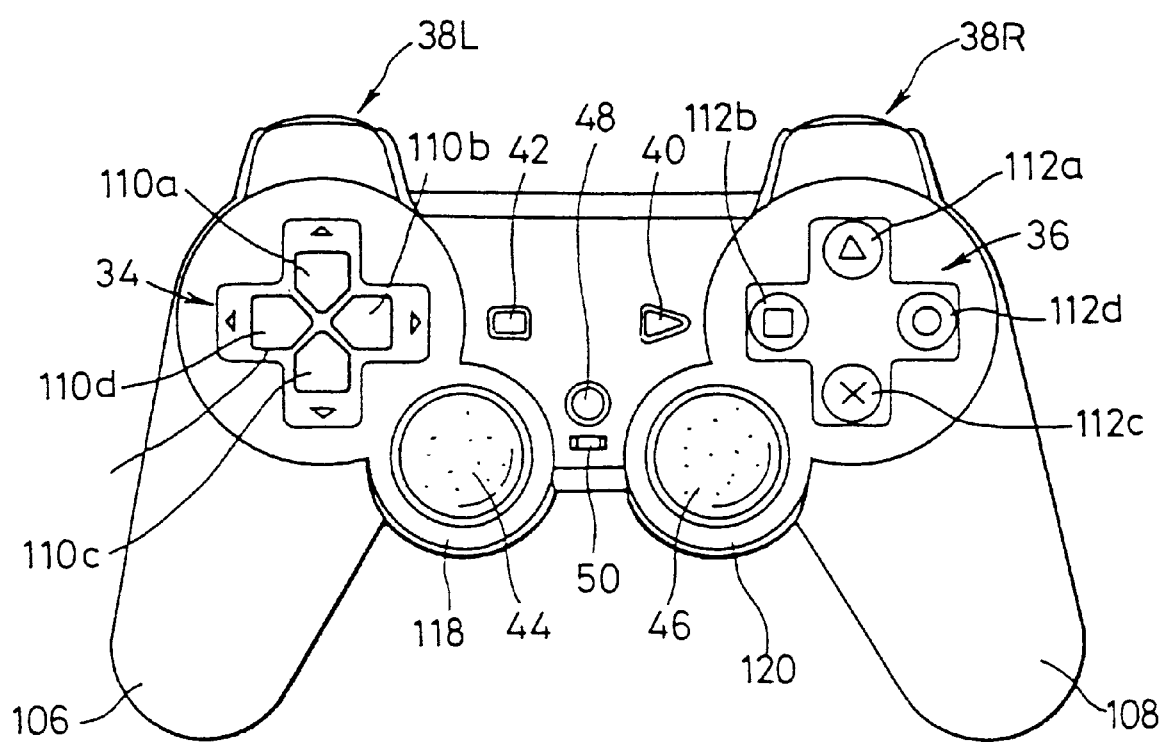
FIG. 4 is a plan view of the manual controller.

As shown in FIGS. 3 and 4, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 4, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 3 and 4, the first control pad 34 is disposed on one end of the housing 104 and comprises first through fourth pressable control members 110a, 110b, 110c, 110d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 3 and 4, the second control pad 36 is disposed on the other end of the housing 104 and comprises first through fourth pressable control members 112a, 112b, 112c, 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 5:
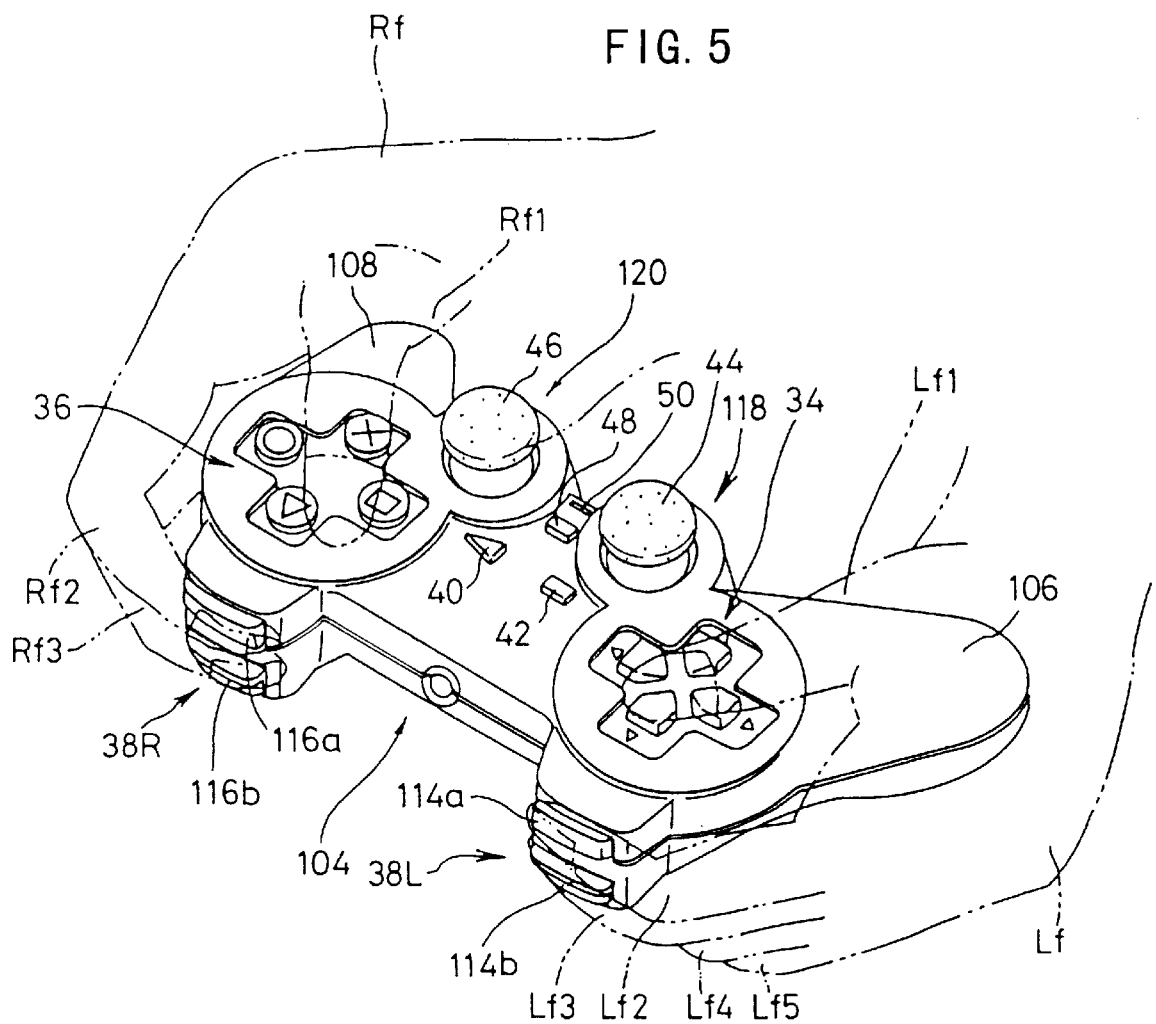
FIG. 5 is a perspective view showing the manner in which the manual controller is used.

The L button 38L and the R button 38R are disposed on a side of the housing 104 remote from the left and right grips 106, 108 and positioned respectively at the opposite ends of the housing 104. As shown in FIG. 5, the L button 38L and the R button 38R have respective first and second pressable control members 114a, 114b and 116a, 116b and respective switch elements associated respectively with the pressable control members 114a, 114b and 116a, 116b.

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 3 and 4, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shaft of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, it can also select a control mode for allowing a command signal to be inputted from the first and second analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 5, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 5, when the left and right grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 5, when the left and right grips 106, 108 are gripped respectively by the palms of the hands of the game player, the index fingers Lf2, Rf2 and middle fingers Lf3, Rf3 of the left and right hands can extend over positions where they can selectively press the first and second pressable control members 114a, 114b and 116a, 116b of the L button 38L and the R button 38R.

Figure 6:
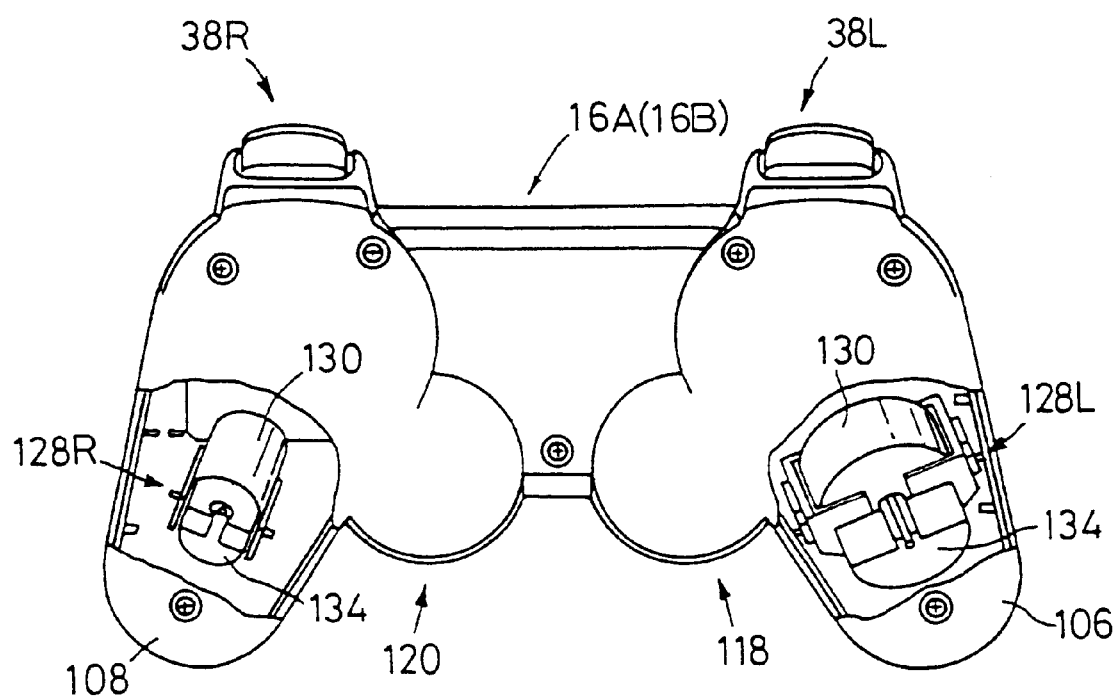
FIG. 6 is a bottom view, partly broken away, of the manual controller, showing vibration imparting mechanisms disposed respectively in left and right grips.

As shown in FIG. 6, the manual controller 16 has a pair of vibration imparting mechanisms 128L, 128R for imparting vibrations to the user in order for the user to be able to play a highly realistic game.

As shown in FIG. 6, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128R, 128L have basically the same structure except their vibration characteristics, only the right vibration imparting mechanism 128R will be described for the purpose of brevity.

Figure 7:
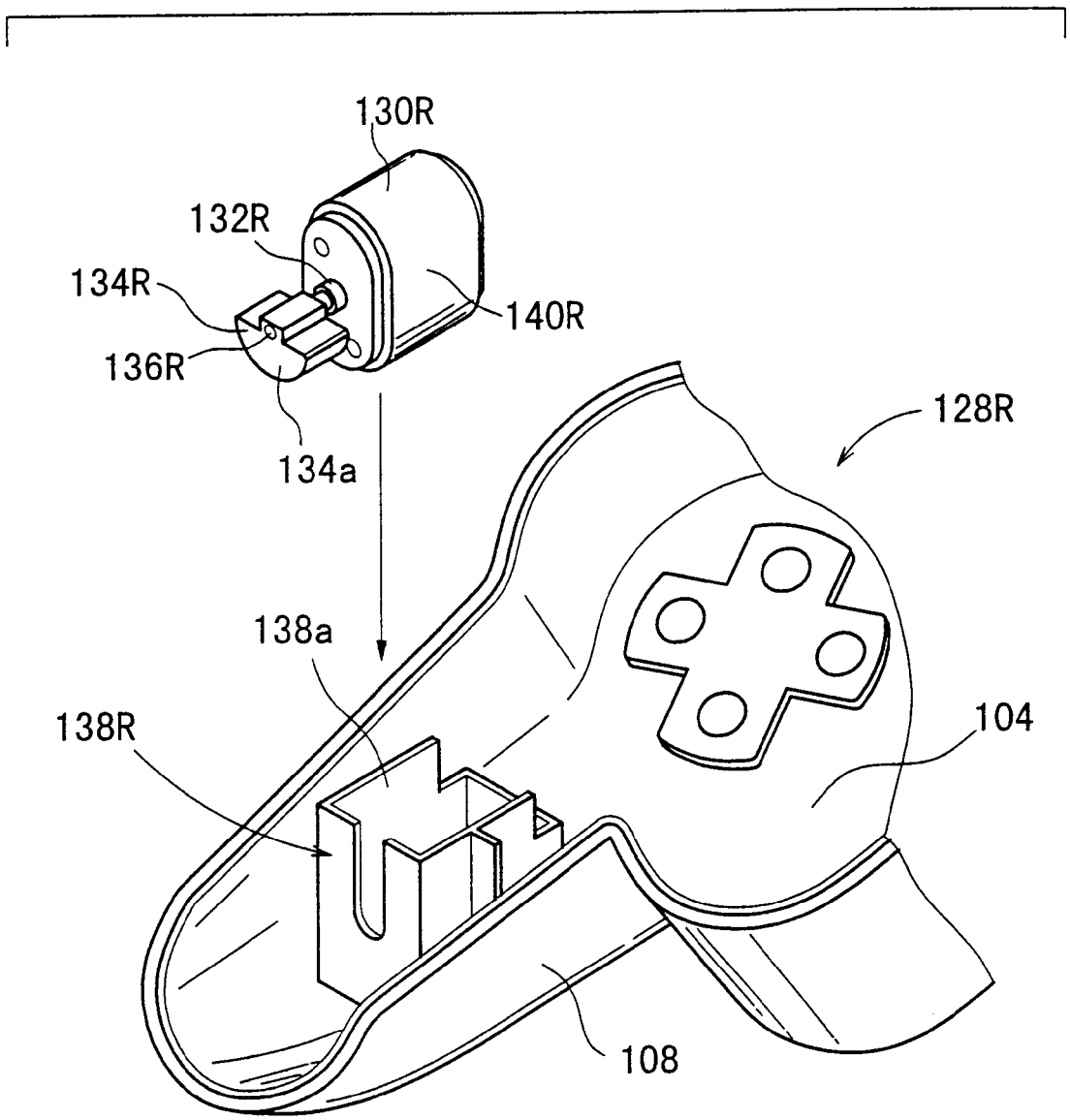
FIG. 7 is an exploded perspective view showing the vibration imparting mechanism.

As shown in FIG. 7, the vibration imparting mechanisms 128R comprises a motor 130R energizable by a vibration generating command supplied from the entertainment apparatus 12, and an eccentric member 134R mounted eccentrically on the drive shaft 132R of the motor 130R.

The eccentric member 134R comprises a weight 134a in the form of a heavy metal member having a semicircular cross-sectional shape. The weight 134a has an off-center hole defined therein in which the drive shaft 132R of the motor 130R is fitted.

Figure 8:
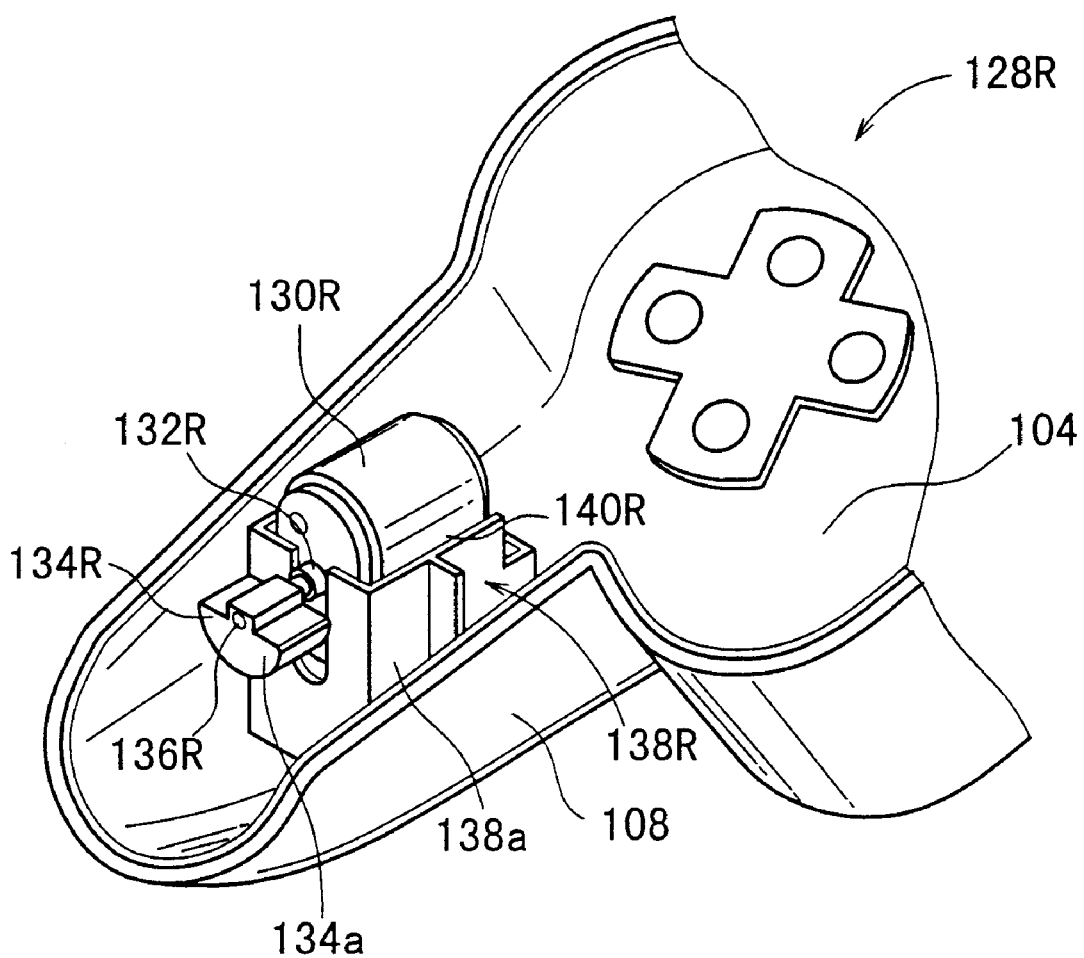
FIG. 8 is a perspective view showing a condition in which the vibration imparting mechanism is incorporated in the manual controller.

As shown in FIG. 8, the motor 130R is accommodated in a supporting compartment 138R in the shape of rectangular parallelepiped. A motor housing 140R of the motor 130R is fitted in the supporting compartment 138R.

According to the vibration imparting mechanism 128R as constructed above, when the motor 130R is energized, the drive shaft 132R thereof rotates to cause the eccentric member 134R to rotate in an eccentric motion for thereby generating vibrations, which are imparted to the right grip 108 via a peripheral wall 138a constituting the supporting compartment 138R. Then, the vibrations of the right grip 108 are applied to the hand and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

Specifically, the motor 130L of the left vibration imparting mechanism 128L is bigger than the motor 130R of the right vibration mechanism 128R. The rotational speed of the motor 130L varies according to a vibration value $V_L$ included in a vibration generating command transmitted from the entertainment apparatus 12. That is, vibrations having different frequencies can be generated depending on the vibration value $V_L$. In the present embodiment, the vibration frequency varies in proportion to the vibration value $V_L$.

The motor 130R of the right vibration mechanism 128R is energized or deenergized according to the vibration value $V_R$ included in the vibration generating command. If the vibration value $V_R$ is "1", the motor 130R of the right vibration mechanism 128R is energized. If the vibration value $V_R$ is "0", the motor 130R of the right vibration mechanism 128R is deenergized. In contrast to the motor 130L of the left vibration mechanism 128L, when the motor 130R of the right vibration mechanism 128R is energized, it rotates at a constant speed to generate vibrations at a constant frequency.

In order to energize the motors 130R, 130L to vibrate the manual controller 16 in its entirety, a bidirectional communication function needs to be provided between the manual controller 16 and the entertainment apparatus 12. This bidirectional communication function will be described later on.

Circuit arrangements of the entertainment apparatus 12 and the manual controller 16 will be described below with reference to FIGS. 9 through 11.

Figure 9:
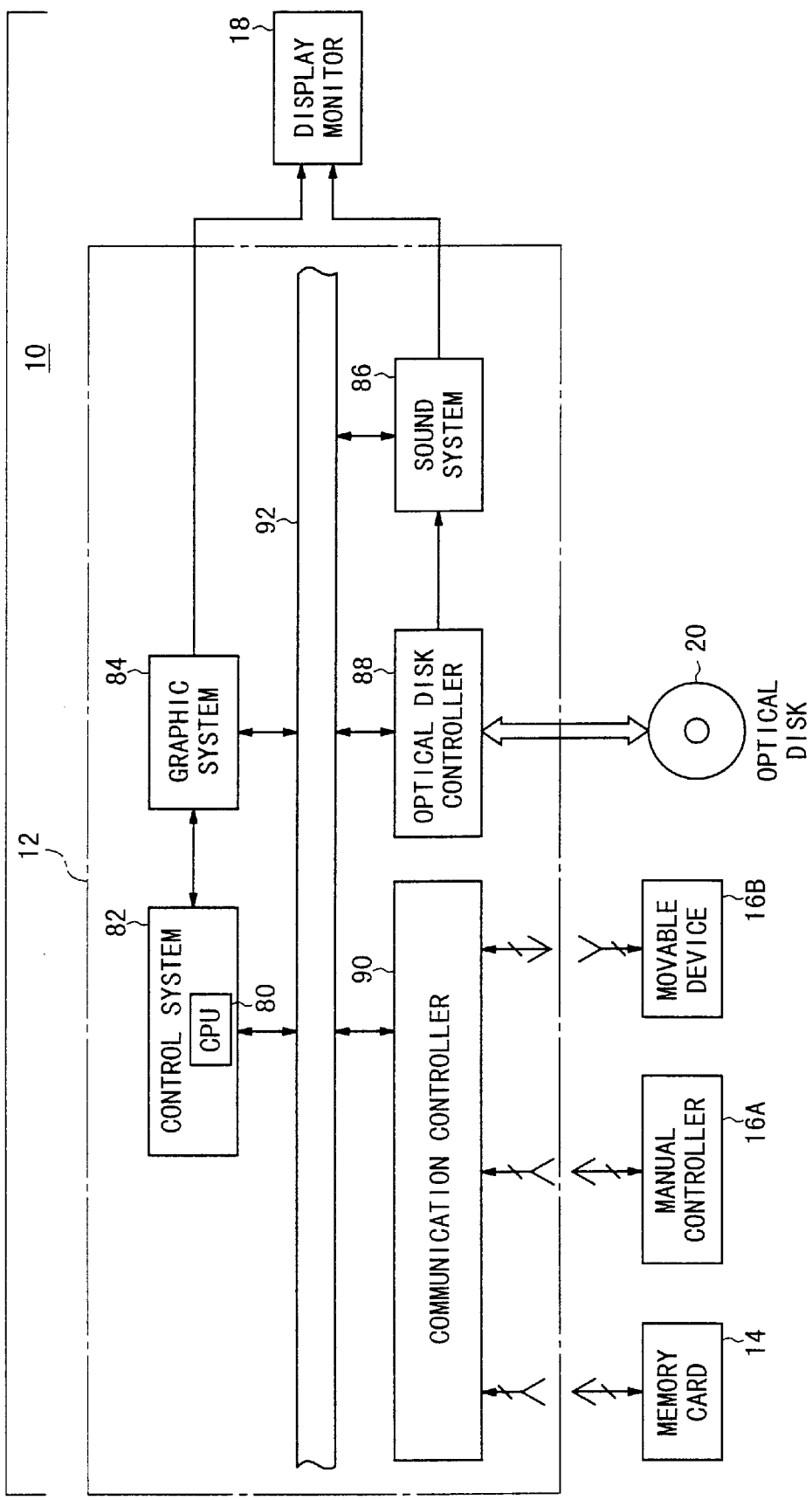
FIG. 9 is a block diagram showing a circuit arrangement of the entertainment apparatus.

As shown in FIG. 9, the entertainment apparatus 12 comprises a control system 82 including a central processing unit (CPU) 80 and peripheral devices thereof, a graphic system 84 including a frame buffer (not illustrated) and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16 and the memory card 14, and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the monitor screen of the display monitor 18 and reproduce sounds from the speakers of the display monitor 18.

Figure 10:
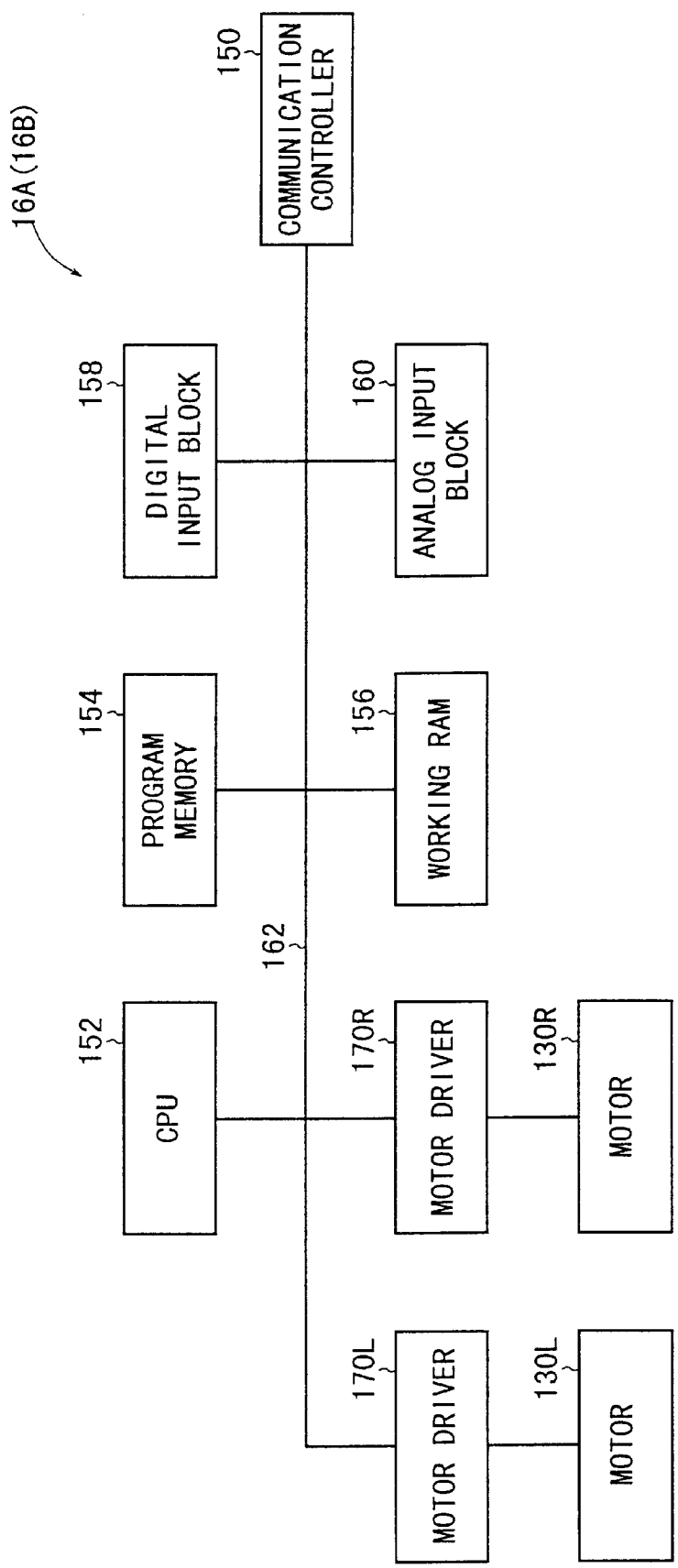
FIG. 10 is a view showing a system of the manual controller.

As shown in FIG. 10, the manual controller 16 comprises a communication controller 150, a CPU 152, a program memory 154, a working RAM 156, a digital input block 158, an analog input block 160, the left motor driver 170L, the left motor 130L, the right motor driver 170R, and the right motor 130R. These components of the manual controller 16 are connected to a bus 162.

The digital input block 158 functions as a manual input controller for the first through fourth pressable control members 110a–110d of the first control pad 34 and the first through fourth pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 90 of the entertainment apparatus 12 (see FIG. 9), for example, for data communication with the entertainment apparatus 12.

Figure 11:
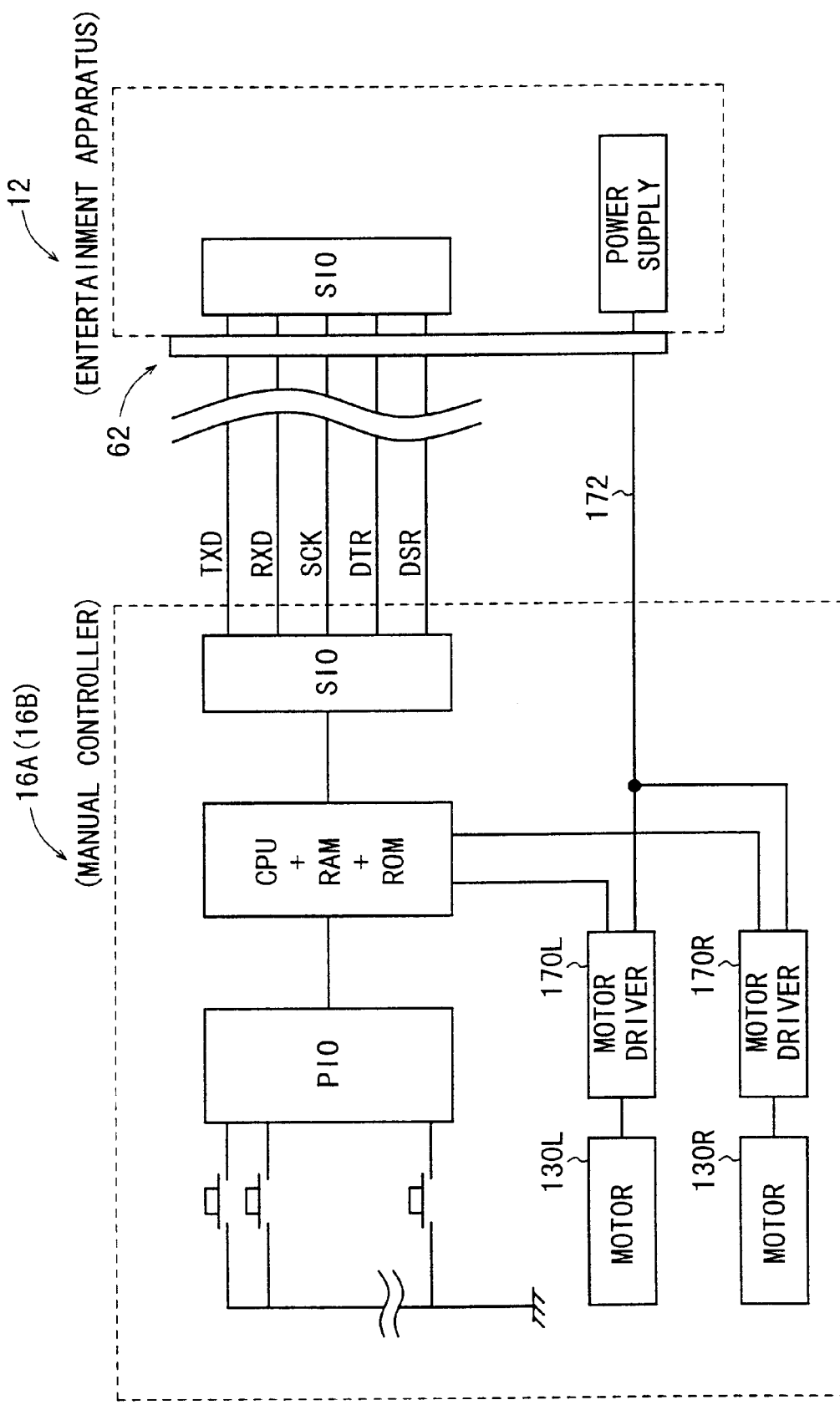
FIG. 11 is a block diagram of main components for carrying out bidirectional serial communications between the manual controller and the entertainment apparatus.

As shown in FIG. 11, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and motor drivers 170R, 170L for energizing the motors 130R, 130L of the vibration imparting mechanisms 128R, 128L. The motors 130R, 130L are energized for rotation by voltages and currents supplied from the corresponding motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the manual controller 16 and the entertainment apparatus 12.

Other structural details of the entertainment apparatus 12 are omitted from illustration in FIG. 11.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. As shown in FIG. 11, this cable further includes a power line 172 extending from a power supply in the entertainment apparatus 12 and connected to the motor drivers 170R, 170L in the manual controller 16 for supplying electric energy to energize the motors 130R, 130L.

A process of bidirectional serial communication between the manual controller 16 and the entertainment apparatus 12 will be described below. In order for the entertainment apparatus 12 to communicate with the manual controller 16 to read manipulation data of the control buttons (button information), the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends manipulation data produced by a control button via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data of control buttons to the entertainment apparatus 12, and the entertainment apparatus 12 can send a vibration generating command for energizing the motors 130R, 130L of the vibration imparting mechanisms 128R, 128L via the data transfer signal line TXD to the manual controller 16.

The vibration generating command for energizing the motors 130R, 130L has been established in advance in a CD-ROM set in the entertainment apparatus 12. Alternatively, the vibration generating command is generated by the entertainment apparatus 12.

A characteristic function of the entertainment system 10 according to the present embodiment will be described below with reference to FIGS. 2 and 12 through 23.

As shown in FIG. 2, the characteristic function of the entertainment system 10 is to move the manual controller 16B as a movable device in accordance with an instruction from the entertainment apparatus 12 (the manual controller 16B will also be referred to as the movable device 16B). In particular, according to the present embodiment, the movable device 16B moves synchronously with (in unison with) the movement of an object 180 displayed on the display monitor 18.

The object 180 moves on the display monitor 18 according to analog input signals from the manual controller 16A, specifically, analog input values generated by manually controlling the left and right joysticks 44, 46.

Figure 12:
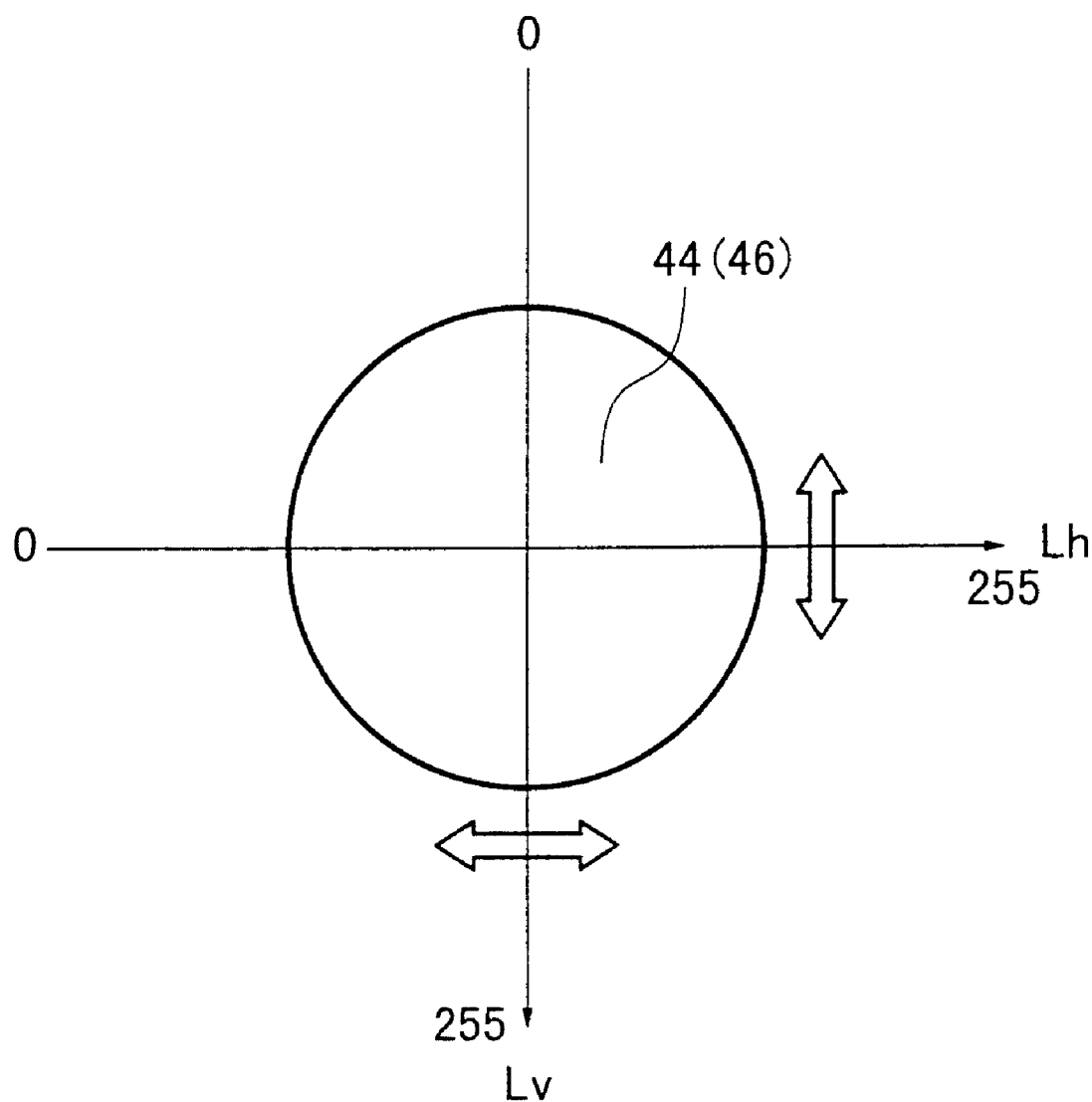
FIG. 12 is a view showing a relationship between a vertical value and left or right joystick, and a relationship between a horizontal value and the left or right joystick.

The analog input values generated by controlling the left and right joysticks 44, 46 are determined by the positions of the left and right joysticks 44, 46. In FIG. 12, the relationship between the position of the left joystick 44 or the right joystick 46 and the analog input value is shown. It is to be understood that one analog input value comprises two directional values, that is, the value in the vertical direction (vertical value Lv), and the value in the horizontal direction (horizontal value Lh) depending on the vertical position and the horizontal position of the joystick. The vertical value Lv is in the range of "0" through "255" from the upper end position to the lower end position. Similarly, the horizontal value Lh is in the range of "0" through "255" from the left end position to the right end position.

Figure 13:
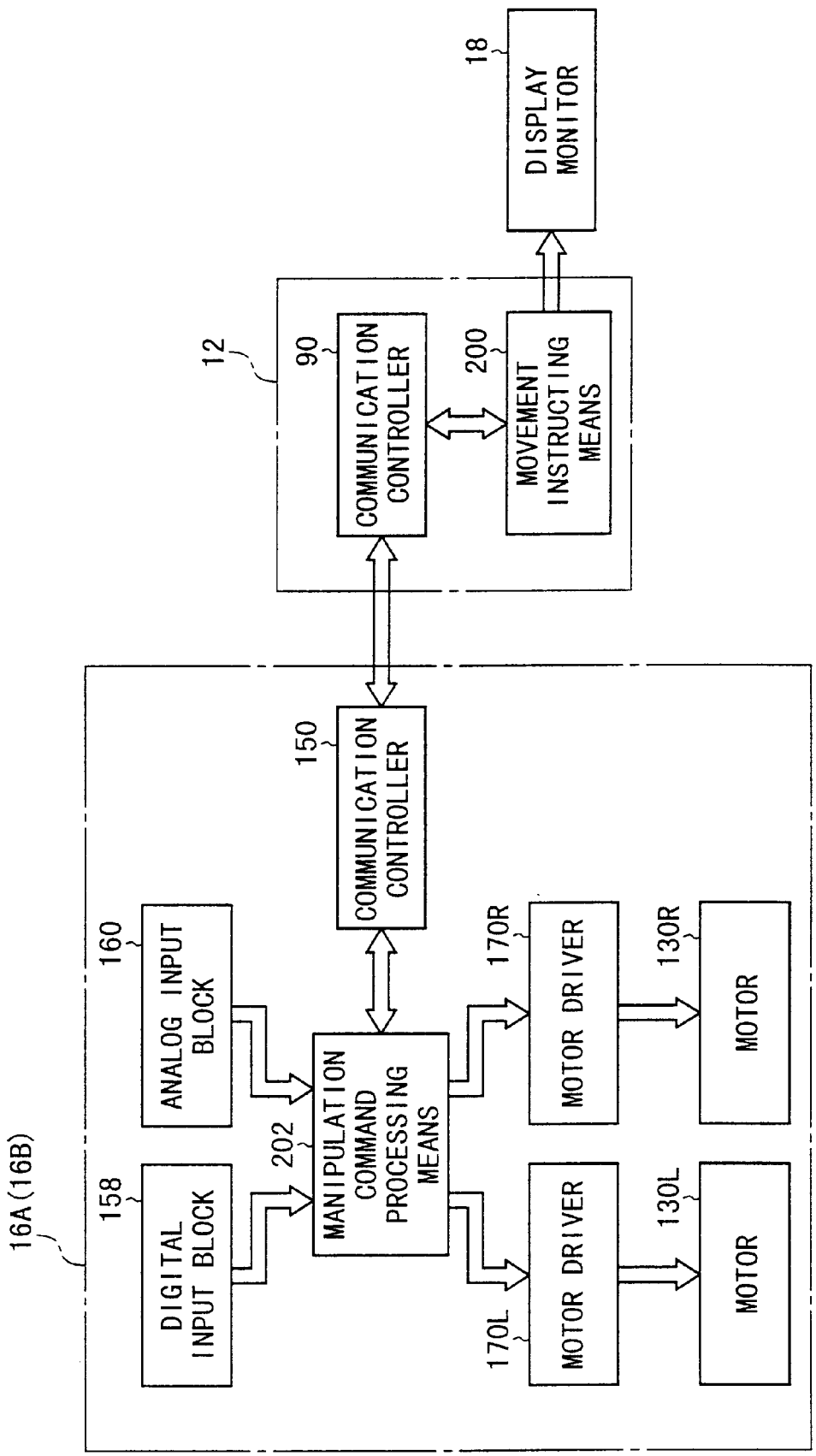
FIG. 13 is a functional block diagram showing the entertainment system according to the embodiment of the present invention.

As shown in FIG. 13, software for carrying out the characteristic function of the entertainment system comprises movement instructing means 200 stored in the entertainment apparatus 12 and manipulation command processing means 202 stored in the manual controllers 16 (16A, 16B). The movement instructing means 200 allows the manual controller 16 (movable device 16B) to move synchronously with the movement of the object 180 displayed on the display monitor 18. The manipulation command processing means 202 transmits manipulation data upon request from the entertainment apparatus 12 and energizes the motor 130R and/or the motor 130L in accordance with the vibration generating command from the entertainment apparatus 12.

The movement instructing means 200 can be downloaded from an optical disk such as a CD-ROM to the entertainment apparatus 12. Specifically, as shown in FIG. 9, the optical disk 20 is played back by the optical controller 88 to read the movement instructing means 200 and the read movement instructing means 200 is stored in a main memory of the entertainment apparatus 12 by a predetermined process. Thereafter, the movement instructing means 200 is executed by the CPU 80 in the control system 82 of the entertainment apparatus 12.

The manipulation command processing means 202 is transferred from the program memory 154 of the manual controller 16 to the working RAM 156, for example. Thereafter, the manipulation command processing means 202 is executed by the CPU 152 of the manual controller 16.

Figure 14:
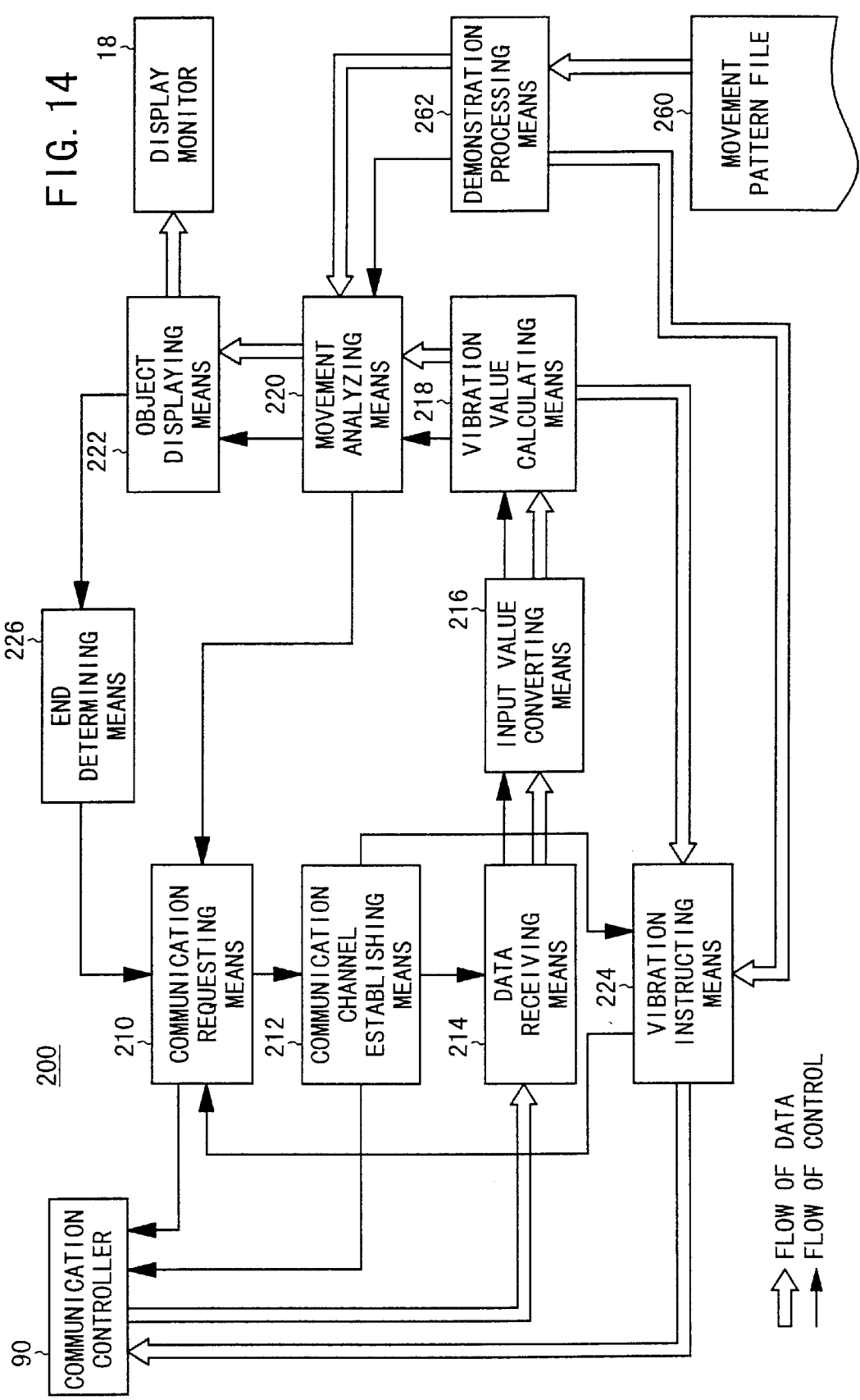
FIG. 14 is a view showing a functional block diagram showing a system of movement instructing means.

As shown in FIG. 14, the movement instructing means 200 comprises communication requesting means 210, communication channel establishing means 212, and data reception means 214. The communication requesting means 210 generates a data transfer request, that is, a request for transmitting manipulation data to the entertainment apparatus 12 (data transmission request), or a request for receiving a vibration generating command VC (data reception request) from the entertainment apparatus 12. The data transfer request is transmitted to the manual controller 16 via the communication controller 90 of the entertainment apparatus 12. The communication channel establishing means 212 establishes a communication channel between the communication controller 90 of the entertainment apparatus 12 and the communication controller 150 of the manual controller 16 for allowing data communication between the entertainment apparatus 12 and the manual controller 16. The data receiving means 214 receives the manipulation data from the manual controller 16 via the established communication channel.

The movement instructing means 200 further comprises input value converting means 216, vibration value calculating means 218, movement analyzing means 220, object displaying means 222, vibration instructing means 224, and end determining means 226. The input value converting means 216 converts the value of the received manipulation data, specifically, converts the analog input value inputted from the manual controller 16 (the joystick 44 or 46) such that the joystick 44 or 46 partially loses its sensitivity. That is, the input value converting means 216 allows the sensitivities of the joysticks 44, 46 to be suppressed so that the user can manipulate the joysticks 44, 46 more easily. Thereafter, the converted analog input value is further converted into a value indicative of only the degree of leaning or tilting (inclination value) of the left or right joysticks 44, 46. The vibration value calculating means 218 calculates a vibration value to be applied to the vibration imparting mechanism 128R or the vibration imparting mechanism 128L based on the inclination value. The movement analyzing means 220 analyzes movement of the object 180 based on the vibration value. The object displaying means 222 allows the object 180 to be displayed on the display monitor 18 and moves the object 180 in accordance with movement information obtained by the movement analysis of the movement analyzing means 220. The vibration instructing means 224 generates a vibration generating command VC based on the vibration value and transmits the vibration generating command VC to the manual controller 16. The end determining means 226 determines whether the process of the entertainment apparatus 12 is finished or not.

Figure 15:
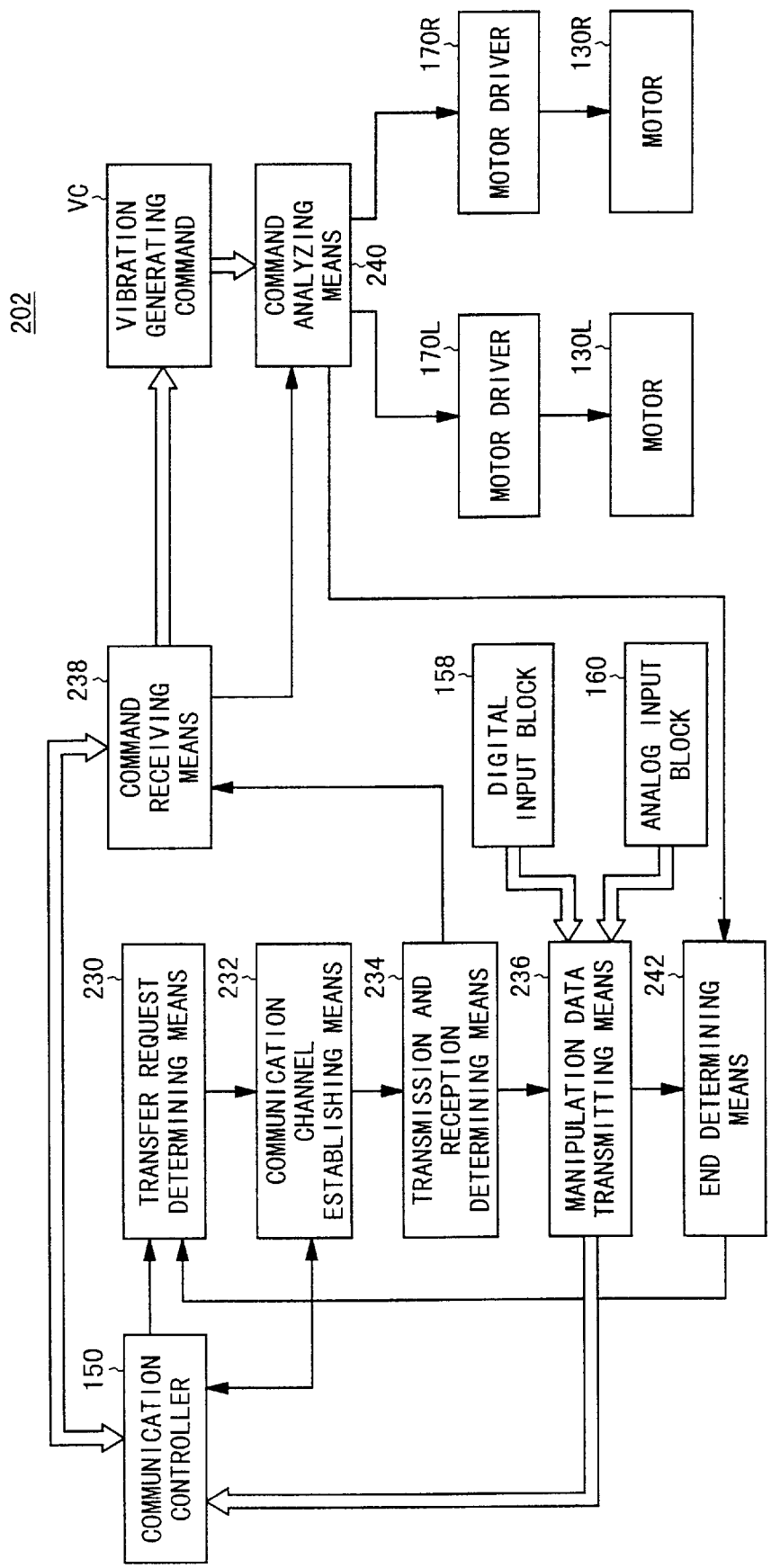
FIG. 15 is a view showing a functional block diagram showing a system of manipulation processing means.

As shown in FIG. 15, the manipulation command processing means 202 in the manual controller 16 comprises transfer request determining means 230, communication channel establishing means 232, and transmission and reception determining means 234. The transfer request determining means 230 determines whether there is a data transfer request or not via the communication controller 150. If it is determined that there is a data transfer request, the communication channel establishing means 232 establishes a communication channel between the communication controller 150 of the manual controller 16 and the communication controller 90 of the entertainment apparatus 12 for allowing data communication between the manual controller 16 and the entertainment apparatus 12. The transmission and reception determining means 234 determines whether the data transfer request is a data reception request or a data transmission request.

The manipulation command processing means 202 further comprises manipulation data transmitting means 236, command receiving means 238, command analyzing means 240, and end determining means 242. The manipulation data transmitting means 236 transmits manipulation data from the digital input block 158 and the analog input block 160 to the entertainment apparatus 12 via the established communication channel. The command receiving means 238 receives the vibration generating command VC from the entertainment apparatus 12 via the established communication channel. The command analyzing means 240 analyzes the received vibration generating command VC and outputs the analyzed result to the motor driver 170R and/or the motor driver 170L. The end determining means 242 determines whether the process of the manual controller 16 is finished or not.

Next, the processing sequence of the movement instructing means 200 in the entertainment apparatus 12 and the processing sequence of the manipulation command processing means 202 in the manual controller 16A (the movable device 16B) will be described specifically with reference to flow charts of FIG. 16 through FIG. 20.

Figure 16:
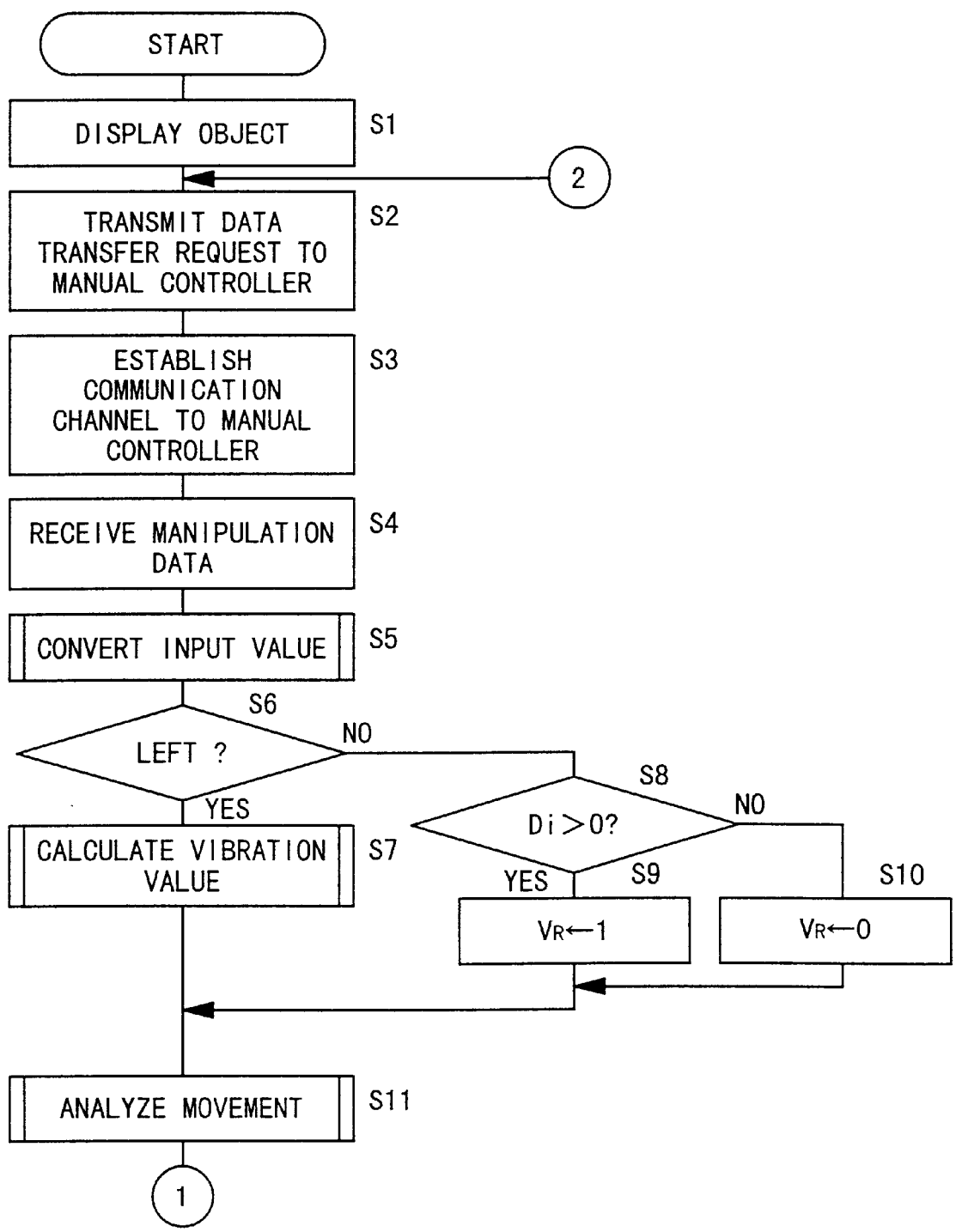
FIG. 16 is a flow chart (No. 1) showing a processing sequence of the movement instructing means.

In Step S1 of FIG. 16, the object displaying means 222 of the movement instructing means 200 outputs image data of a certain object, for example, the object 180 indicative of a crab shown in FIG. 2, for displaying the object 180 on the display monitor 18.

Next, in Step S2, the communication requesting means 210 of the movement instructing means 200 generates a data transfer request to transmit manipulation data from the manual controller 16A to the entertainment apparatus 12. The data transfer request is transmitted to the manual controller 16A via the communication controller 90 of the entertainment apparatus 12. Then, the control goes to Step S3.

In Step S3, the communication channel establishing means 212 of the movement instructing means 200 establishes a communication channel between the communication controller 90 of the entertainment apparatus 12 and the communication controller 150 of the manual controller 16A for allowing data communication between the entertainment apparatus 12 and the manual controller 16A.

At this time, the manipulation command processing means 202 in the manual controller 16A performs the following processes.

Figure 20:
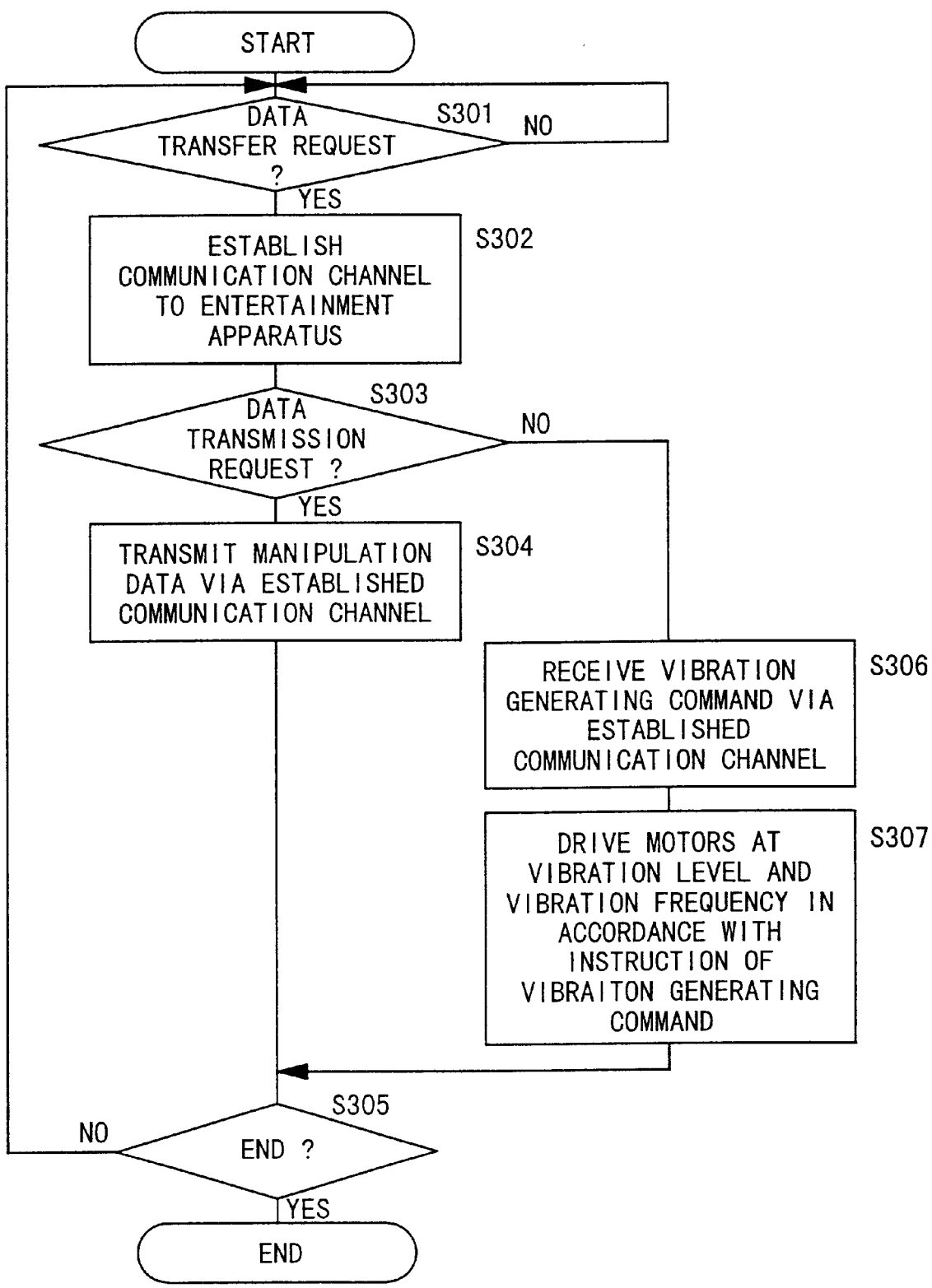
FIG. 20 is a flow chart showing a processing sequence of the manipulation processing means.

In Step S301 of FIG. 20, the transfer request determining means 230 of the manipulation command processing means 202 waits for a data transfer request from the entertainment apparatus 12. When the transfer request determining means 230 determines that there is a data transfer request, the control goes to Step S302.

In Step S302, the communication channel establishing means 232 of the manipulation command processing means 202 establishes a communication channel between the communication controller 150 of the manual controller 16A and the communication controller 90 of the entertainment apparatus 12 for allowing data communication between the manual controller 16A and the entertainment apparatus 12.

The process of the communication channel establishing means 212 in Step S3 and the process of the communication channel establishing means 232 in Step S302 can be performed cooperatively.

Then, in Step S303, the transmission and reception determining means 234 of the manipulation command processing means 202 determines whether the data transfer request is a request for transmitting manipulation data (data transmission request) or not.

If it is determined that the data transfer request is a data transmission request, the control goes to Step S304. In Step S304, the manipulation data transmitting means 236 of the manipulation command processing means 202 transmits manipulation data from the digital input block 158 or the analog input block 160 via the established communication channel.

When the process of Step S304 is finished, the control goes to Step S305. In Step S305, the end determining means 242 of the manipulation command processing means 202 determines whether there is a request for ending the process of the manipulation command processing means 202 in the manual controller 16A (ending request). If it is determined that there is no ending request, the control goes back to Step S301 for transmitting manipulation data again.

If it is determined that there is an ending request, the process of the manipulation command processing means 202 is brought to an end.

The routine of the movement instructing means 200 in FIG. 16 will be described again from Step S4. In Step 4, the data receiving means 214 of the movement instructing means 200 receives the manipulation data from the manual controller 16A via the established communication channel and stores the received manipulation data in the main memory, for example. If the manipulation data is based on the manipulation input of the left joystick 44 or the right joystick 46, a code identifying "left" or "right", a vertical value Lv, and a horizontal value Lh are stored in the main memory. Then, the control goes to Step S5 for performing the process of the input value converting means 216 of the movement instructing means 200. The process of Step S5 will be described in detail with reference to FIG. 18.

In Step S101, the input value converting means 216 determines whether the vertical value Lv is in the range of $0 \leq Lv \leq 89$ or not. If it is determined that the vertical value Lv is in the range of $0 \leq Lv \leq 89$, the control goes to Step S102 for subtracting 90 from the current vertical value Lv and storing the subtracted value in a register R1.

If it is determined that the vertical value Lv is not in the range of $0 \leq Lv \leq 89$ in Step S101, the control goes to Step S103 for determining whether the vertical value Lv is in the range of $90 \leq Lv \leq 165$. If it is determined that the vertical value is in the range of $90 \leq Lv \leq 165$, the control goes to step S104 for storing a value "0". in the register R1.

If it is determined that the vertical value Lv is not in the range of $90 \leq Lv \leq 165$ in Step S103, the control goes to Step S105 for subtracting 165 from the current vertical value Lv and storing the subtracted value in the register R1.

As described above, the process of converting the vertical value Lv can be performed by Steps S101 through S105. Similarly the process of converting the horizontal value Lh can be performed by Steps S106 through S110.

By the processing sequence of Steps S101 through S110, the vertical value and the horizontal value of a position around the central position of the left joystick 44 or the right joystick 46 ($90 \leq Lv \leq 165$, $90 \leq Lh \leq 165$) are converted into "0", respectively. Accordingly, the left and right joysticks 44, 46 are given some "play" around their central positions (neutral positions). That is, minute displacement of the joystick around the central position can not be recognized to generate an effective analog input value.

If the "play" is not given to the left and right joysticks 44, 46 by Steps S101 through S110, the sensitivity of the joysticks becomes excessively high. In this case, since slight manipulation (displacement) of the left joystick 44 or the right joysticks 46 always results in the movement of the movable device 16B, it is extremely difficult for the user to control the movement of the movable device 16B by manipulating the right and left joysticks 44, 46 of the manual controller 16A. The "play" for manipulating the left and right joysticks 44, 46 allows the user to easily manipulate the joysticks by fingers for controlling the movement of movable device 16B.

Then, in Step S111, an inclination value DV of the left joystick 44 or the right joystick 46 is calculated by the following expression.

$$Di = \sqrt{(R1^2 + R2^2)}$$

The calculated inclination value Di is in the range of $0 \leq Di \leq 90$.

Next, the main routine of FIG. 16 will be described again from Step S6. In Step S6, it is determined that whether the present manipulation is the manipulation of the left joystick 44 or not based on the received code identifying "left" or "rights".

If it is determined that the present manipulation is the manipulation of the left joystick 44, the control goes to Step S7. In Step S7, the vibration calculating means 218 of the movement instructing means 200 calculates a vibration value $V_L$ to be applied to the left motor 130L of the vibration imparting mechanism 128L (hereinafter referred to as the left vibration value) based on the inclination value.

The left vibration value $V_L$ is calculated by the following expression.

$$V_L = 255 \times \text{inclination value } (Di)/90$$

The calculated inclination value is in the range of 0 through 255. It is because there are 256 vibration levels for the left motor 130L. The left vibration value $V_L$ corresponds to the vibration level. That is, if the left vibration value $V_L$ is "0", the vibration level is the minimum. If the left vibration value $V_L$ is "255", the vibration level is the maximum.

If it is determined that the present manipulation is manipulation of the right joystick 46, the control goes to Step S8 for determining whether the inclination value Di is greater than "0". If it is determined that the inclination value Di is greater than "0", the control goes to Step S8 for setting a vibration value $V_R$ to be applied to the motor 130R of the vibration imparting mechanism 128R (hereinafter referred to as the right vibration value) to "1". If it is determined that the inclination value is "0", the control goes to Step S10 for setting the right vibration value $V_R$ to "0".

When any one of the processes in Steps S7, S9, or S10 is finished, the control goes to Step S11 for performing the process of the movement analyzing means 220 of the movement instructing means 200. The process of Step S11 will be described in detail with reference to FIG. 19.

Figure 19:
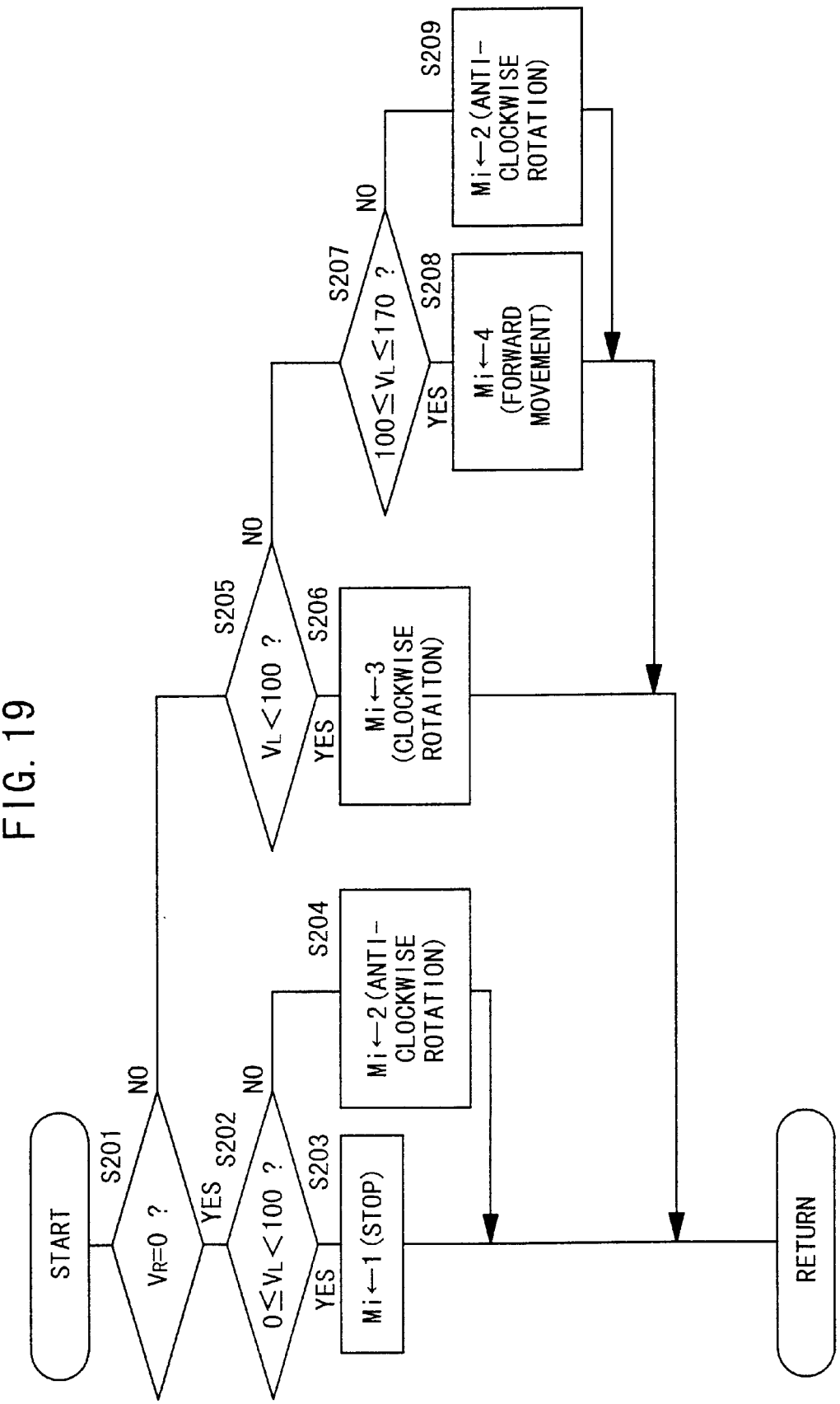
FIG. 19 is a flow chart showing a processing sequence of movement analyzing means.

As shown in FIG. 19, the movement analyzing means 220 of the movement instructing means 200 determines the movement status from the following statuses 1 through 4 by analyzing the left vibration value $V_L$ and the right vibration value $V_R$.

Status 1: stop
Status 2: anti-clockwise rotation
Status 3: clockwise rotation
Status 4: forward movement A number obtained by the movement analysis is registered with a register Mi as a value indicative of the movement status. Specifically, values "1", "2", "3", and "4"of the register Mi indicate status 1, status 2, status 3, and status 4, respectively.

The process of the movement analyzing means 220 can be performed by Steps S201 through S209 shown in FIG. 19.

In Step S201, it is determined that whether the right vibration value $V_R$ is "0" ($V_R$=0) or not. If it is determined that the right vibration value $V_R$ is "0", the control goes to Step S202. In Step S202, it is determined whether the left vibration value $V_L$ is in the range of $0 \leq V_L < 100$ or not. If it is determined that the left vibration value $V_L$ is in the range of $0 \leq V_L < 100$ in Step S202, the control goes to Step S203 for storing the value "1" indicative of status 1 (stop) in the register Mi.

If it is determined that the left vibration value $V_L$ is not in the range of $0 \leq V_L < 100$ in Step S202, the control goes to Step S204 for storing the value "2" indicative of status 2 (anti-clockwise rotation) in the register Mi.

If it is determined that the right vibration value $V_R$ is not "0". in Step S201, the control goes to Step S205. In Step S205, it is determined whether the left vibration value $V_L$ is less than 100 ($V_L$<100) or not. If it is determined that the left vibration value $V_L$ is less than 100, the control goes to Step S206 for storing the value "3" indicative of status 3 (clockwise rotation) in the register Mi.

If it is determined that the left vibration value $V_L$ is not less than 100 in Step S205, the control goes to Step S207. In Step S207, it is determined whether the left vibration value $V_L$ is in the range of $100 \leq V_L \leq 170$. If it is determined that the left vibration value $V_L$ is in the range of $100 \leq V_L \leq 170$ in Step S207, the control goes to Step S208 for storing the value "4" indicative of status 4 (forward movement) in the register Mi. If it is determined that the left vibration value $V_L$ is not in the range of $100 \leq V_L \leq V_L \leq 170$ in Step S207, the control goes to Step S209 for storing the value "2" indicative of status 2 (anti-clockwise rotation) in the register Mi.

Figure 17:
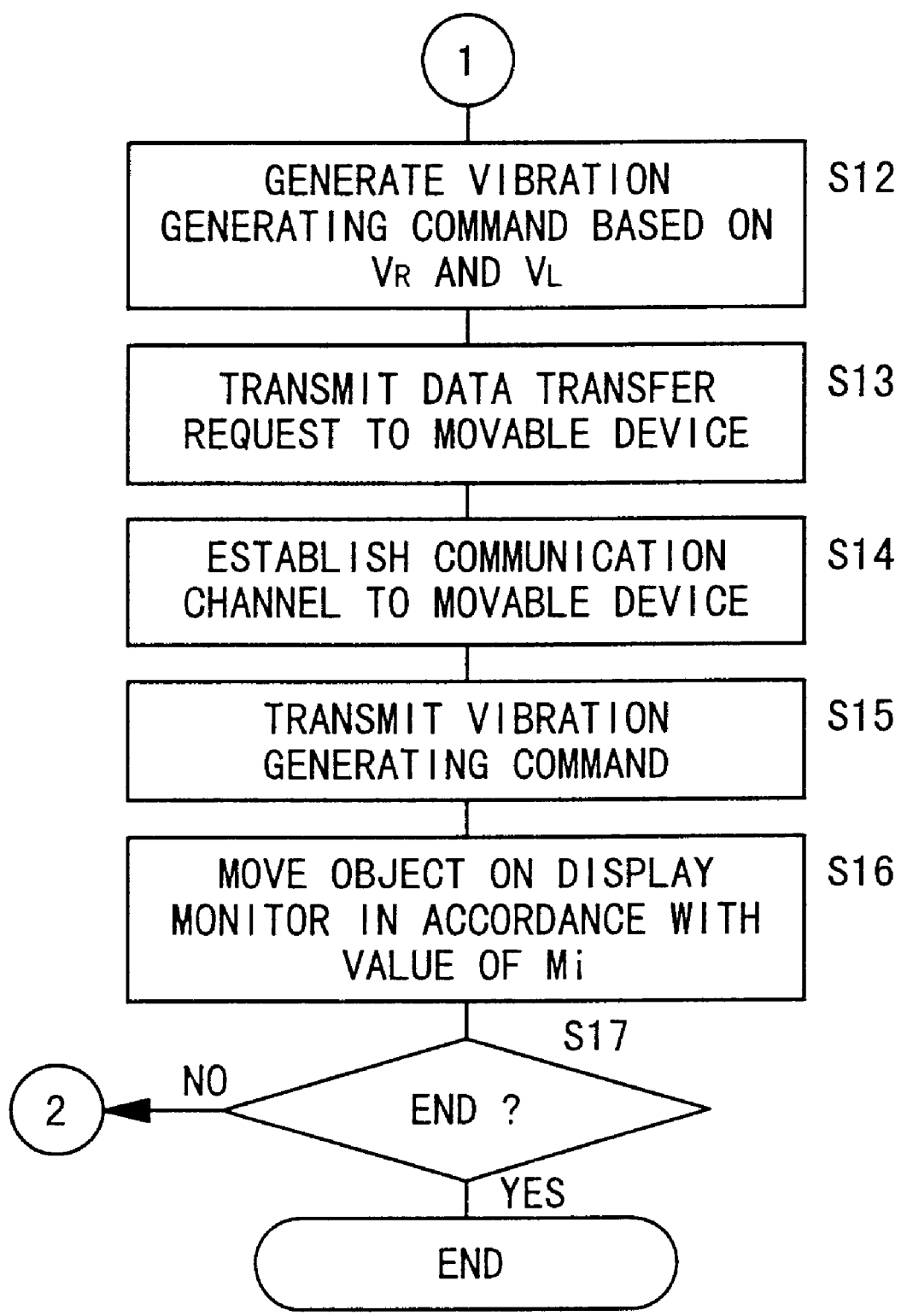
FIG. 17 is a flow chart (No. 2) showing a processing sequence of the movement instructing means.
Figure 18:
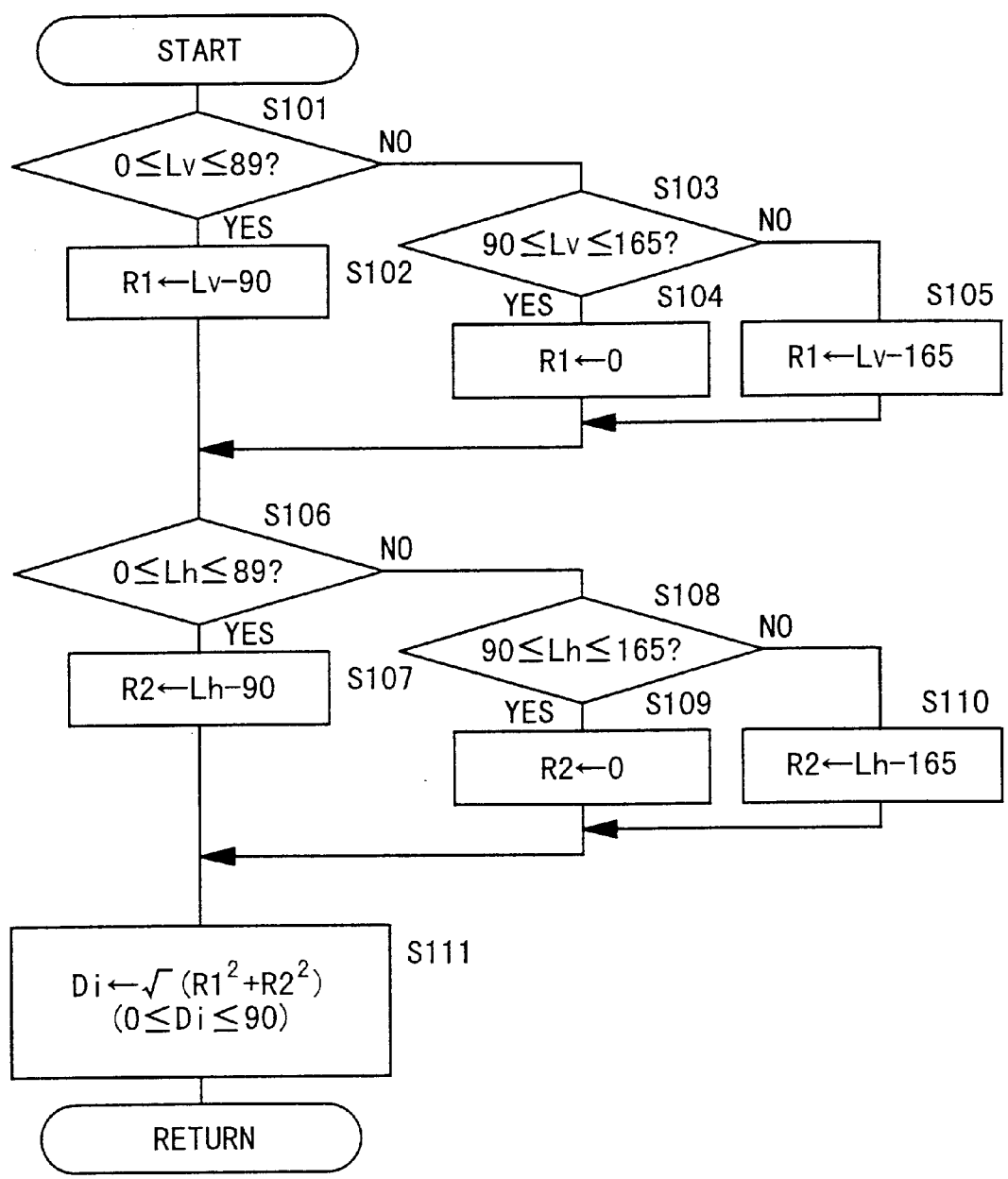
FIG. 18 is a flow chart showing a processing sequence of input value converting means.

Next, the main routine of the movement instructing means 200 will be described again from Step S12 with reference to FIG. 17. In Step S12, the vibration instructing means 224 of the movement instructing means 200 generates a vibration generating command VC based on the right vibration value $V_R$ and the left vibration value $V_L$. Then, the control goes to Step S13.

In Step S13, the communication requesting means 210 of the movement instructing means 200 generates a data transfer request for receiving the vibration generating command VC (data reception request) and send the data transfer request to the movable device 16B via the communication controller 90 of the entertainment apparatus 12. Thereafter, in Step S14, The communication channel establishing means 212 of the movement instructing means 200 establishes a communication channel between the communication controller 90 of the entertainment apparatus 12 and the communication controller 150 of the manual controller 16B for allowing data communication between the entertainment apparatus 12 and the manual controller 16. Thereafter, in Step S15, the vibration instructing means 224 of the movement instructing means 200 transmits the vibration generating command VC to the movable device 16B via the established communication channel.

At this time, the process of receiving the vibration generating command VC is performed by the manipulation command processing means 202 in the movable device 16B. The processing sequence of the manipulation command processing means 202 will be described with reference to FIG. 20.

In Step S301, the transfer request determining means 230 of the manipulation command processing means 202 waits for a data transfer request from the entertainment apparatus 12.

When the transfer request determining means 230 determines that there is a data transfer request, the control goes to Step S302.

In Step S302, the communication channel establishing means 232 of the manipulation command processing means 202 establishes a communication channel between the communication controller 150 of the movable device 16B and the communication controller 90 of the entertainment apparatus 12 for allowing data communication between the movable device 16B and the entertainment apparatus 12. The process of the communication channel establishing means 212 in Step S14 and the process of the communication channel establishing means 232 in Step S302 can be performed cooperatively.

Then, in Step S303, the transmission and reception determining means 234 of the manipulation command processing means 202 determines whether the data transfer request is a request for transmitting manipulation data (data transmission request) or not.

In this case, since the data transfer request is not a data transmission request, that is, the data transfer request is a request for receiving the vibration generating command VC (data reception request), the control goes to Step S306.

In Step S306, the command receiving means 238 of the manipulation command processing means 202 receives the vibration generating command VC via the established communication channel. Then, the control goes to Step S307.

In Step S307, the command analyzing means 240 of the manipulation command processing means 202 analyzes the received vibration generating command VC and outputs the analyzed result to the respective left motor driver 170L and right motor driver 170R.

The right motor driver 170R energizes the motor 130R based on the right vibration value $V_R$ outputted from the command analyzing means 240. Specifically, if the right vibration value is "1", the motor 130R is supplied with a driving current for energizing the motor 130R. In this manner, a certain vibration is imparted to the right grip 108. If the right vibration value $V_R$="0", the supply of the driving current to the motor drive is interrupted.

The left motor driver 170 drives the motor 130L such that rotation speed of the motor 130L changes depending on the left vibration value $V_L$ (0 through 255) from the command analyzing means 240, thereby vibrating the left grip 106 at a vibration level (strength) and a vibration frequency corresponding to the left vibration value $V_L$.

When the process of Step 307 is finished, the control goes to Step S305. In Step S305, the end determining means 242 of the manipulation command processing means 202 determines whether there is a request for ending the process of the manipulation command processing means 202 in the movable device 16B (ending request). If it is determined that there is no ending request, the control goes back to Step S301 for receiving another vibration generating command VC.

If it is determined that there is an ending request, the process of the manipulation command processing means 202 is brought to an end.

Then, the routine of movement instructing means 200 shown in FIG. 17 will be described again from Step S16. In Step S16, the object displaying means 222 of the movement instructing means 200 moves the object 180 displayed on the display monitor 18 in accordance with the value of the register Mi.

Specifically, if the value of the register Mi is "1", the object displaying means 222 stops the movement of the object 180. In this case, since the right vibration value $V_R$ is 0 and the left Vibration value $V_L$ is in the range of $0 \leq V_L < 100$, the movable device 16B also stops its movement.

If the value of the register Mi is "2", the object displaying means 222 moves the object 180 to rotate anticlockwise. In this case, since the right vibration value $V_R$ is 0 and the left vibration value $V_L$ is in the range of $100 \leq V_L \leq 255$, otherwise, the right vibration value is 1 and the left vibration value $V_L$ is in the range of $170 < V_L \leq 255$, the movable device 16B also rotates anti-clockwise.

If the value of the register Mi is "3", the object displaying means 222 moves the object 180 to rotate clockwise. In this case, since the right vibration value $V_R$ is 1 and the left vibration value $V_L$ is less than 100 ($V_L < 100$), the movable device 16B also rotates clockwise.

If the value of the register Mi is "4", the object displaying means 222 moves the object 180 forward. In this case, since the right vibration value $V_R$ is 1 and the left vibration value $V_L$ is in the range of $100 \leq V_L \leq 170$, the movable device 16B also moves forward.

Next, in Step S17, the end determining means 226 of the movement instructing means 200 determines whether there is a request for ending the process of the movement instructing means 200 in the entertainment apparatus 12 (ending request). If it is determined that there is no ending request, the control goes back to Step S2 for moving (or stopping) the object 180 displayed on the display monitor 18 and moving (or stopping) the movable device 16B substantially in the same direction based on the manipulation data from the manual controller 16A.

If it is determined that there is an ending request, the process of the manipulation command processing means 200 is brought to an end.

As described above, according to the present invention, an entertainment system comprises the entertainment apparatus 12 for executing various programs, at least one manual controller 16A for inputting a manual control request of a user to the entertainment apparatus 12, and at least one movable device 16B which moves in accordance with an instruction from the entertainment apparatus 12. Therefore, the movable device 16B moves actually in accordance with the instruction from the entertainment apparatus 12. Accordingly, it is possible for a user to virtually moves the object 180 displayed on the display monitor 18 and actually moves the movable device 16B synchronously with the movement of the object 180 by manipulating the manual controller 16A.

If the entertainment system 10 according to the present embodiment is applied to a conventional video game apparatus, the user can not only enjoy a video game on the display monitor 18, but also enjoy the video game by viewing the actual movement of the movable device 16B. Therefore, a new amusing aspect can be added to the video game.

According to the above-described embodiment, the object 180 displayed on the display monitor 18 and the movable device 16B connected to the entertainment apparatus 12 move simultaneously based on the manipulation data from the manual controller 16A. Alternatively, it is possible to move the object 180 and the movable device 16B based on data of a predetermined movement pattern.

In this case, as shown in FIG. 14, the movement instructing means 200 may comprise demonstration processing means 262. The demonstration processing means 262 sequentially reads data of a movement pattern (for example, a right vibration value $V_R$ and a left vibration value $V_L$) from a movement pattern file 260 which stores data array of a predetermined movement pattern.

A possible file structure for the movement pattern file 260 is shown in FIG. 21. The movement pattern file 260 comprises a plurality of records (record 0, record 1, ... ). Each record stores a left vibration value $V_L$ and a right vibration value $V_R$.

Next, the processing sequence of the demonstration processing means 262 will be described with reference to a flow chart of FIG. 22.

Figure 22:
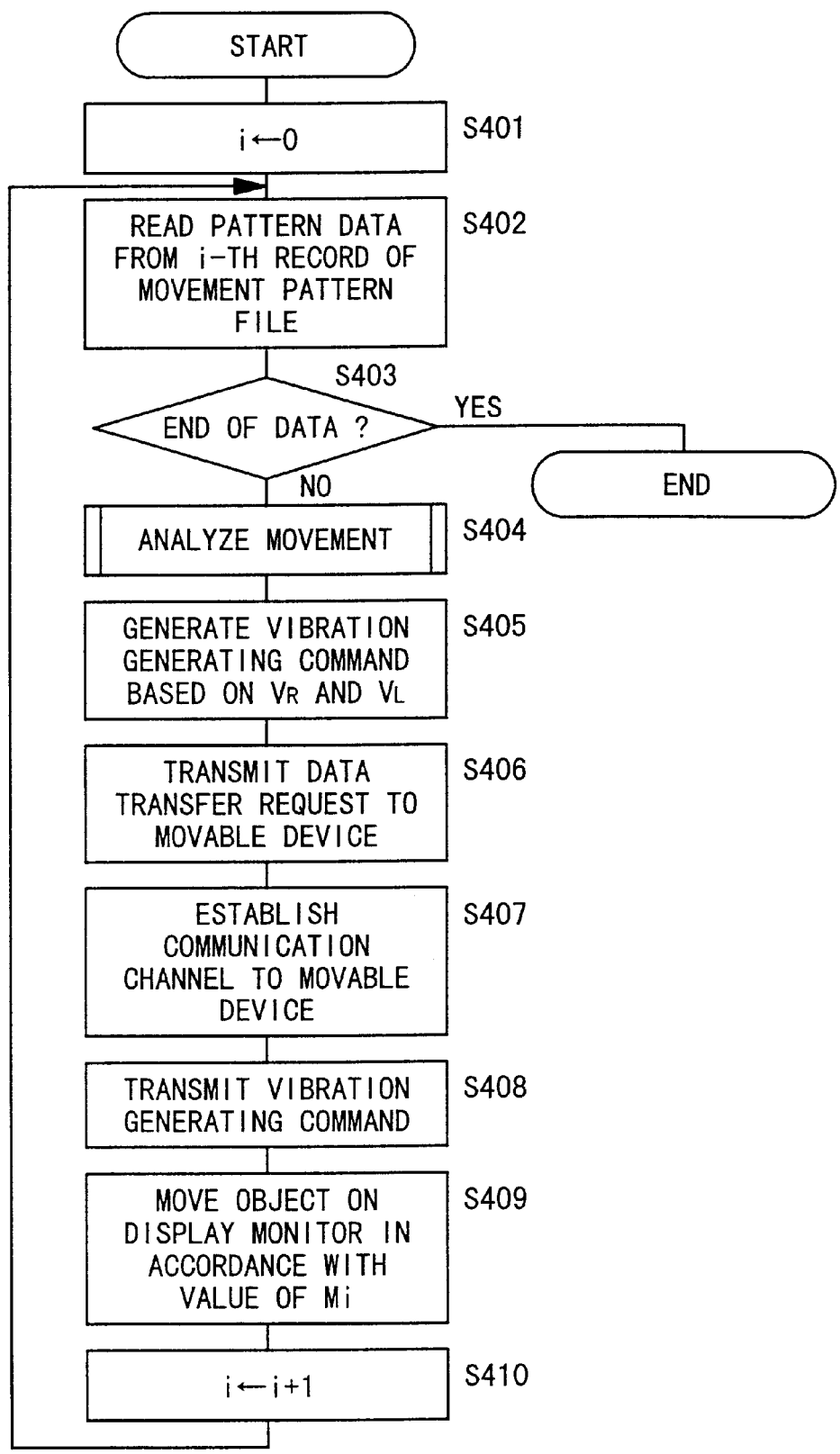
FIG. 22 is a flow chart showing a processing sequence of demonstration processing means.

In Step S401 of FIG. 22, the demonstration processing means 262 stores an initial value "0" in an index register i used for retrieval of a record from the movement pattern file 260 and initializes the index register i. Then, the control goes to Step S402.

In Step S402, the demonstration processing means 262 read pattern data (a left vibration value $V_L$ and a right vibration value $V_R$) from i-th record of the movement pattern file 260.

Next, in Step S403, the demonstration processing means 262 determines whether the read pattern data is a code indicating an end of data, for example, EOD (End Of Data) or not. If it is determined that the read pattern data is not a code indicating an end of data, the control goes to Step S404 for performing the process of the movement analyzing means 220. Since the processing sequence of the movement analyzing means 220 has already been described with reference to FIG. 19, it will not be described again for the purpose of brevity. By the process of the movement analyzing means 220, a value indicative of a movement status (1: stop, 2: anti-clockwise rotation, 3: clockwise rotation, 4: forward movement) is obtained based on the left vibration value $V_L$ and the right vibration value $V_R$, and the obtained value is stored in the register Mi.

Next, in Step S405, the vibration instructing means 224 generates a vibration generating command VC based on the left vibration value $V_L$ and the right vibration value $V_R$. Then, the control goes to Step S406. In Step S406, the communication requesting means 210 transmit a data transfer request to the manual controller 16B via the communication controller 90. Then, in Step S407, the communication establishing means 212 establishes a communication channel between the communication controller 90 of the entertainment apparatus 12 and the communication controller 150 of the manual controller 16 for allowing data communication between the entertainment apparatus 12 and the manual controller 16B. Thereafter, in Step S408, the vibration instructing means 224 transmit the vibration generating command VC to the movable device 16B via the established communication channel.

Next, in Step S409, the object displaying means 222 moves the object 180 displayed on the display monitor 18 in accordance with the value of the register Mi.

In this manner, the movable device 16B moves synchronously with the movement of the object 180 displayed on the display monitor 18.

Then, after updating the value of the index register i to be incremented by 1 in Step S410, the control goes back to Step S402 for repeating the processes of Step S402 and the subsequent steps. That is, pattern data of the next record is read from the movement pattern file 260 to move the object 180 and the movement device 16B based on the read pattern data.

If it is determined that the read pattern data is a code indicating an end of data in Step S403. The process of the demonstration processing means 262 is brought to an end.

With the demonstration processing means 262, it is possible to move the object 180 and the movable device 16B based on a predetermined pattern data. Accordingly, it is possible to reproduce various kinds of demonstrations by virtually moving the object 180 on the display monitor 18 and actually moving the movable device 16B.

According to the above embodiment, the single movable device 16B moves synchronously with the single object 180 displayed on the display monitor 18.

Alternatively, it is possible to move a plurality of movable devices synchronously with a plurality of objects displayed on a display monitor for allowing a game to be played by a plurality of users.

An example of the alternative embodiment is shown in FIG. 23. In FIG. 23, two sumo wrestlers are displayed as the objects 180A, 180B. Further, two models of the sumo wrestlers are shown in a sumo ring as the movable devices 16C, 16D. In this embodiment, the two manual controllers 16A, 16B, and the two movable devices 16C, 16D are connected to one of the slots (for example, the slot 30A) of the entertainment apparatus 12 via a connecting hub 250. It is to be understood that the movable devices 16C, 16D are not limited to be constructed as the manual controller 16A, 16B. The movable devices 16C, 16D can take any shapes such as the models of sumo wrestlers as shown in FIG. 23 for adding a further amusing aspect to the game. Each of movable devices 16C, 16D is equipped with vibration imparting mechanisms like the left and right vibration imparting mechanisms 128L, 128R of the manual controller 16. Accordingly, a user can move the movable device 16C and the object 180A displayed on the display monitor 18 synchronously by manipulating the manual controller 16A and another user can move the movable device 16D and the object 180B displayed on the display monitor 18 synchronously by manipulating the manual controller 16B. Accordingly, it is possible to provide a new method for playing a match game for a plurality of users.

The entertainment system and the recording medium shall not be limited to the particular embodiment disclosed herein. It will be apparent to a person skilled in the art that numerous modifications and variation may be made without departing from the spirit and scope of the invention.

What is claimed is:

1. An entertainment system comprising:
    an entertainment apparatus for executing various programs;
    at least one manual controller for inputting a manual control request of a user to said entertainment apparatus;
    at least one movable device, said movable device being movable in accordance with an instruction from said entertainment apparatus;
    a display monitor for displaying an image outputted from said entertainment apparatus; and
    movement instructing means for moving said movable device synchronously with the movement of an object displayed on said display monitor,
    wherein said movable device comprises vibration generating means for generating vibrations in accordance with said instruction from said entertainment apparatus, said instruction comprising vibration information.

2. An entertainment system according to claim 1, said entertainment system comprising a plurality of said manual controllers,
    wherein at least one of said manual controllers comprises said movable device.

3. An entertainment system according to claim 1, wherein said object moves in accordance with movement information based on an input signal from said manual controller.

4. An entertainment system according to claim 1, wherein said object moves in accordance with predetermined movement information.

5. An entertainment system according to claim 4, wherein said movement instructing means comprises:
    object displaying means for displaying said object on said display monitor and moving said object on said display monitor in accordance with said movement information; and
    vibration instructing means for outputting said movement information to said vibration generating means as said vibration information.

6. An entertainment system according to claim 5, wherein said vibration generating means comprises a plurality of vibration sources having different vibration characteristics; and wherein said vibration instructing means calculates said vibration information to be supplied to each of said vibration sources based on said vibration characteristics of said vibration sources.

7. An entertainment apparatus for executing various programs, said entertainment apparatus being connectable to:

at least one manual controller for inputting a manual control request of a user to said entertainment apparatus;

a display monitor; and at least one movable device, said movable device being movable in accordance with an instruction from said entertainment apparatus, wherein said movable device comprises vibration generating means for generating vibrations in accordance with said instruction from said entertainment apparatus, said instruction comprising vibration information.

8. A recording medium for storing a program and data for use in an entertainment system, said entertainment system comprising:

an entertainment apparatus for executing various programs;

at least one manual controller for inputting a manual control request of a user to said entertainment apparatus, said manual controller being connectable to said entertainment apparatus;

at least one movable device, said movable device being connectable to said entertainment apparatus and movable in accordance with an instruction from said entertainment apparatus; and a display monitor for displaying at least one object, wherein said program comprises the step of generating a movement instruction for moving said movable device synchronously with the movement of said object displayed on said display monitor, and wherein said movable device comprises vibration generating means for generating vibrations in accordance with said instruction from said entertainment apparatus, said instruction comprising vibration information.

9. A recording medium according to claim 8, wherein said object moves in accordance with movement information based on an input signal from said manual controller.

10. A recording medium according to claim 8, wherein said object moves in accordance with predetermined movement information.

11. A recording medium according to claim 8, wherein said step of generating a movement instruction comprises the steps of:

displaying said object on said display monitor and moving said object on said display monitor in accordance with said movement information; and generating a vibration instruction for outputting said movement information to said vibration generating means as said vibration information.

12. A recording medium according to claim 11, wherein said vibration generating means comprises a plurality of vibration sources having different vibration characteristics; and wherein said step of generating a vibration instruction comprises the step of calculating said vibration information to be supplied to each of said vibration sources based on said vibration characteristics of said vibration sources.

13. A program readable and executable by a computer, said program being for use in an entertainment system comprising:

an entertainment apparatus for executing various programs;

at least one manual controller for inputting a manual control request of a user to said entertainment apparatus, said manual controller being connectable to said entertainment apparatus;

at least one movable device, said movable device being connectable to said entertainment apparatus and movable in accordance with an instruction from said entertainment apparatus; and a display monitor for displaying at least one object, wherein said program comprises a movement instructing step for moving said movable device synchronously with the movement of said object displayed on said display monitor, and wherein said movable device comprises vibration generating means for generating vibrations in accordance with said instruction from said entertainment apparatus, said instruction comprising vibration information.

14. A method for operating an entertainment system, comprising the steps of:

executing a program in an entertainment apparatus;

inputting a manual control request of a user to said entertainment apparatus via at least one manual controller;

driving a movable device in accordance with an instruction from said entertainment apparatus;

displaying an image outputted from said entertainment apparatus; and moving said movable device synchronously with the movement of an object displayed on said display monitor, wherein said movable device comprises vibration generating means for generating vibrations in accordance with said instruction from said entertainment apparatus, said instruction comprising vibration information.

15. A method for operating an entertainment system according to claim 14, said entertainment system comprising a plurality of said manual controllers, and wherein at least one of said manual controllers comprises said movable device.

16. A method for operating an entertainment system according to claim 14, further comprising the step of moving said object in accordance with movement information based on an input signal from said manual controller.

17. A method for operating an entertainment system according to claim 14, further comprising the step of moving said object in accordance with predetermined movement information.

18. A method for operating an entertainment system according to claim 17, further comprising the steps of:

displaying said object on said display monitor and moving said object on said display monitor in accordance with said movement information; and outputting said movement information to said vibration generating means as said vibration information.

19. A method for operating an entertainment system according to claim 18, wherein said vibration generating means comprises a plurality of vibration sources having different vibration characteristics, further comprising the step of:

calculating said vibration information to be supplied to each of said vibration sources based on said vibration characteristics of said vibration sources.

* * * * *